(12) United States Patent
Takei

(10) Patent No.: US 8,964,817 B2
(45) Date of Patent: Feb. 24, 2015

(54) FREQUENCY CONVERTER AND WIRELESS REPEATER USING THE SAME, AND WIRELESS REPEATING SYSTEM USING THE SAME

(75) Inventor: Ken Takei, Kawasaki (JP)

(73) Assignee: Hitachi Metals, Ltd., Tokyo (JP)

( * ) Notice: Subject to any disclaimer, the term of this patent is extended or adjusted under 35 U.S.C. 154(b) by 543 days.

(21) Appl. No.: 13/324,113

(22) Filed: Dec. 13, 2011

(65) Prior Publication Data

US 2012/0147931 A1 Jun. 14, 2012

(30) Foreign Application Priority Data

Dec. 14, 2010 (JP) ................. 2010-277895

(51) Int. Cl.
*H04L 25/52* (2006.01)
*G06T 1/00* (2006.01)
*G06T 3/40* (2006.01)
*H04B 7/155* (2006.01)

(52) U.S. Cl.
CPC ... *G06T 1/00* (2013.01); *G06T 3/40* (2013.01); *H04B 7/155* (2013.01)
USPC ............................ 375/214; 375/211; 375/296

(58) Field of Classification Search
CPC ....................................... H04L 25/52
USPC ........................................ 375/214, 296, 211
See application file for complete search history.

(56) References Cited

U.S. PATENT DOCUMENTS

| | | | | |
|---|---|---|---|---|
| 5,512,897 | A * | 4/1996 | Wilson et al. | 341/144 |
| 2002/0137464 | A1* | 9/2002 | Dolgonos et al. | 455/60 |
| 2005/0083996 | A1 | 4/2005 | Robinson et al. | |
| 2010/0027711 | A1 | 2/2010 | Manku et al. | |
| 2011/0004647 | A1* | 1/2011 | Parida et al. | 708/313 |

FOREIGN PATENT DOCUMENTS

| | | |
|---|---|---|
| JP | 9-8553 A | 1/1997 |
| JP | 2000-31880 A | 1/2000 |
| JP | 2007-509582 A | 4/2007 |
| JP | 2010-514279 A | 4/2010 |
| JP | 2010-109469 A | 5/2010 |

OTHER PUBLICATIONS

Japanese Office Action with partial English translation dated Dec. 3, 2013 (2 pages).

* cited by examiner

*Primary Examiner* — Michael Neff
(74) *Attorney, Agent, or Firm* — Crowell & Moring LLP

(57) ABSTRACT

According to a wireless repeating system of the invention, a first analog signal is digitally converted at a first sampling frequency, a converted original digital signal is oversampled at a second sampling frequency higher than the first sampling frequency, an image digital signal occupying a specific frequency band out of plural image digital signals generated by zero-interpolation is extracted via a digital filter, and the image digital signal is input to a delta-sigma demodulator to convert to a second analog signal and output the second analog signal.

9 Claims, 20 Drawing Sheets

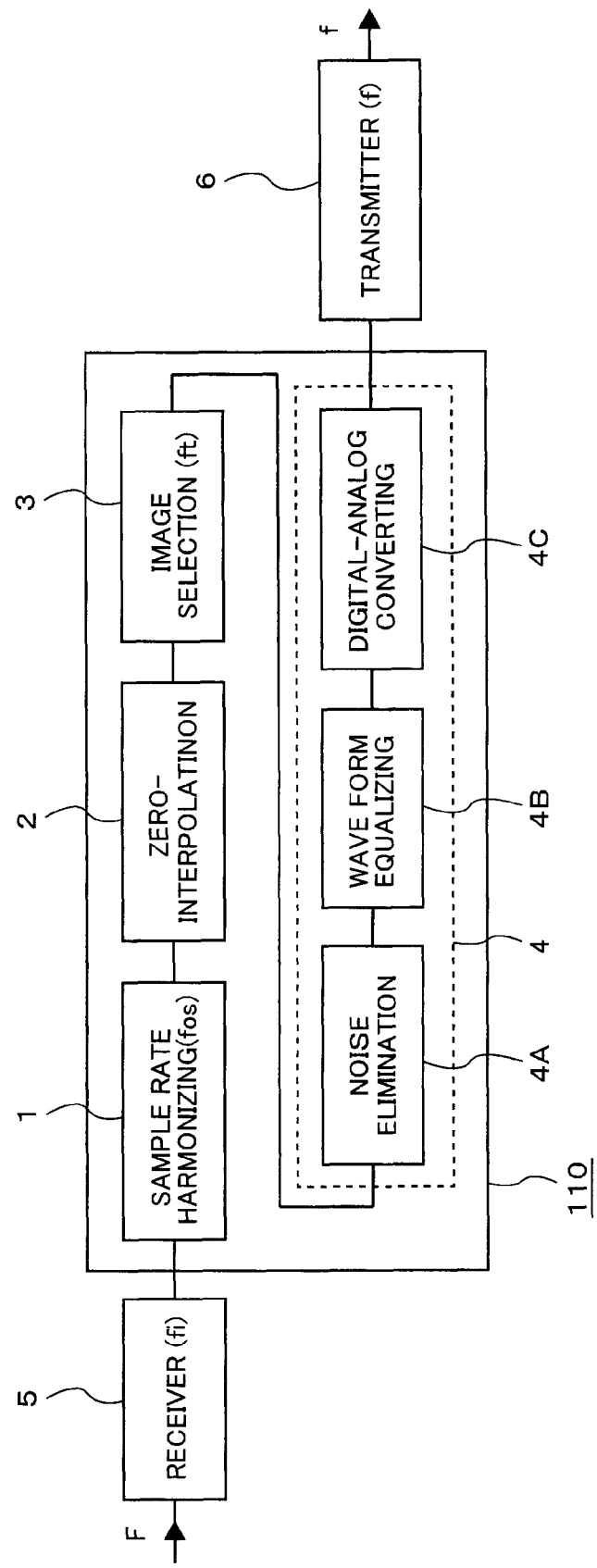

FREQUENCY CONVERTER AND WIRELESS REPEATER USING THE SAME, AND WIRELESS REPEATING SYSTEM USING THE SAME

CLAIM OF PRIORITY

The present application claims priority from Japanese Patent Application JP 2010-277895 filed on Dec. 14, 2010, the content of which is hereby incorporated by reference into this application.

FIELD OF THE INVENTION

The present invention relates to a frequency conversion circuit, a wireless repeater using the same, and a wireless repeating system using the same, and specifically relates to frequency conversion technology suitable for implementing a wireless signal repeater wherein the frequency of receive signal carriers and the frequency of transmit signal carriers are different when repeating wireless signals in a narrow area broadcasting system or the like.

BACKGROUND TECHNOLOGY OF THE INVENTION

In stead of analog broadcasting that broadcasts contents with wireless signals in which analog modulation is applied to the contents, digital broadcasting that broadcasts contents with wireless signals in which digital modulation is applied to the contents starts to prevail worldwide. In digital broadcasting, various characteristic services are provided, such as up-down asymmetrical communications, digital ghost correction, and effective utilization of frequency, which cannot be realized in analog broadcasting. In order to continue contents services provided worldwide in analog broadcasting, most of those contents services are taken over in digital broadcasting. In other words, once digital broadcasting starts, the services in analog broadcasting are almost entirely substituted in digital broadcasting and therefore analog broadcasting service terminates and the frequencies used so far in analog broadcasting can be reused for other wireless communication systems. By using the frequencies used so far in analog broadcasting as well as excess frequency band obtained by improvement in frequency utilization efficiency achieved by digital broadcasting, new broadcasting services not provided in analog broadcasting or fusion of broadcast and communication services are being proposed and put to practice one after another.

Most of these new services were not available in the age of analog broadcasting and are roused by people's new behavior patterns, and many of them are broadcast services in mobile environment or semi-fixed environment using mobile wireless information terminals. Conventionally, broadcasting services for terminals assumed to be fixed (mostly television receivers) are provided by locating a small number of large-scale broadcast stations represented by antenna towers, and those for areas where wireless services are not available from the large-scale broadcast base-station supplemental wired services are provided using RF cables.

Meanwhile, improvement in the operation speed of modern digital signal processing devices is significant and processing speeds equivalent to wireless frequency have already been realized and several times higher processing speeds will soon be realized. In such a high-speed digital signal processing, a technique, called oversampling, of interpolating a digital signal to be processed with a signal of high frequency component and thereby improving the accuracy of the signal processing is disclosed in Japanese Patent Application Laid-open Publication No. 2007-509582, Japanese Patent Application Laid-Open Publication No. 2010-514279, and others.

The oversampling is a process of inserting, between original signals lying on time axis at a first time interval defined by the reciprocal number of a first sampling frequency, a signal at an interval of the reciprocal number of a second sampling frequency that is an integral multiple of the first sampling frequency to interpolate the original digital signals and thereby improve the digital signal processing accuracy. In this interpolation, if a zero signal is inserted at an interval of the reciprocal number of the second sampling frequency, images of the original digital signals are generated as an integral multiple of the original digital signal and lie on the frequency axis. The fact that each frequency spectrum of the each image is the same as the frequency spectrum of the original digital signal is long known in association with the sampling theorem proposed by Shannon in 1948.

SUMMARY OF THE INVENTION

Since new services in the age of digital broadcasting often assumes mobile or movable terminals, the area where a large-scale broadcast base-station should provide services extends from the point dotted distribution of fixed terminals to plain area of mobile terminals and consequently the area where the large-scale broadcast station cannot provide services extends. To address such a mobile characteristic of terminals, there is a rapidly increasing demand for wireless complementary services for the area where the large-scale broadcast base-station. Since media that can be used for wireless broadcast is effectively limited electromagnetic waves, it is very difficult to use frequencies being used by other wireless systems. Accordingly, an effective method is to provide broadcast services using radio waves of same frequency at a place located far away from the base-station and radio waves therefrom sufficiently attenuate by suppressing the transmission output of radio waves from the base-station utilizing electromagnetic wave propagation attenuation characteristics.

In this method, assuming that there are plural base-stations (BS1, BS2) that provide broadcast services received from the large-scale broadcast base-station (HUB), at least one base-station (BS1) that uses a specific frequency for providing broadcast services is required to deliver, to the other base-station (BS2) that provide broadcast services using the same frequency, broadcasting contents provided from the large-scale broadcast base-station (HUB) independently of the broadcast services of both the base-stations.

Conventionally, delivery of the same contents to the plural base-stations is performed via RF cables. Since leakages, to outside space, of signals being transmitted in a RF cable are negligibly small, they do not interfere with the broadcast services being provided at specific frequencies by both the base-stations. As the number of wireless terminals (TS) wanting to be provided with the services increases, amount of electromagnetic waves to be transmitted to each wireless terminal from a base-station increases, and consequently it becomes necessary to increase the transmission output of the base-station. However, if a base-station increases the transmission output, radio waves from the base-station also reach wireless terminal (TS) in the area where the radio waves did not reach until then, which makes it impossible for both base-stations (BS1, BS2) to provide services due to radio interference.

Since different terminals rarely exist at the same location in effect, the increase of terminals wanting to be provided with broadcast services means that areal density of the terminals becomes uniform. Under this condition, it is possible to cope with the increase of terminals wanting to be provided with broadcast services by locating many broadcast base-stations (BS) with small output. However, the number of RF cables used for delivering the contents to those many base-stations (BS) increases exponentially, which increases not only the geological area to be secured for building the base-stations but also the cost of building the base-station due to increased number of RF cables, thus becoming a serous problem.

Accordingly, it is necessary to deliver contents to the broadcast base-station (BS) wirelessly without using RF cables. Since the same frequency as frequency f used for broadcasting cannot be used, this wireless delivery of contents to the base-station is performed using a different frequency from frequency f being transmitted from the base-station. In this case, the base-station serves as a wireless repeater in which reception frequency f that is received from the large-scale broadcast base-station (HUB) is different from transmission frequency f on which the same contents is re-delivered to a terminal (TS) and a frequency converter is required as a component thereof.

A conventional frequency converter includes a mixer and a local oscillator as its main components. The mixer is an intrinsic non-linear analog circuit and the local oscillator requires an oscillator that is called a source oscillator and has an excellent frequency stability. Therefore, the frequency converter is expensive because its manufacturing and tuning costs are extremely high. Further, if the frequency to be converted is different, it is necessary to rework the local oscillator or add an expensive frequency synthesizer that allows oscillation frequency to be variable. Typically in broadcasting, since plural frequencies called channels are used in order to deliver multiple contents simultaneously, the above-mentioned frequency needs to be changed very frequently.

A subject of the present invention is to implement a wireless repeater that provide wireless broadcast services requiring frequency conversion, without using an expensive frequency converter. Another subject is to implement a wireless repeater and a wireless repeating system that meet the requirement for changing a conversion frequency in the frequency conversion that characterizes broadcast services.

A typical example of the present invention is as follows. That is, a frequency converter for wireless repeating of the present invention comprising: an original digital signal generator for generating an original digital signal by digitally converting a first analog signal at a first frequency; an oversampler for oversampling the original digital signal at a second frequency higher than the first frequency; a zero interpolator for generating a plurality of image digital signals by interpolating a data point after the oversampling; a frequency axis image selector for selecting an image digital signal occupying a specific frequency band out of the plurality of image digital signals; and a digital-analog converter for performing noise elimination and waveform shaping for the selected image digital signal occupying a specific frequency band, converting to a second analog signal, and outputting the second analog signal.

The present invention enables signals received by a wireless repeater to be frequency-converted and transmitted via digital circuits without using an analog frequency converter comprising a mixer and a local oscillator, which is effective for down-sizing the wireless repeater.

BRIEF DESCRIPTION OF THE DRAWINGS

FIG. 1A is a diagram showing a configuration of a first embodiment of a frequency converter of the present invention;

DETAILED DESCRIPTION OF THE EMBODIMENTS

Figure 1B:
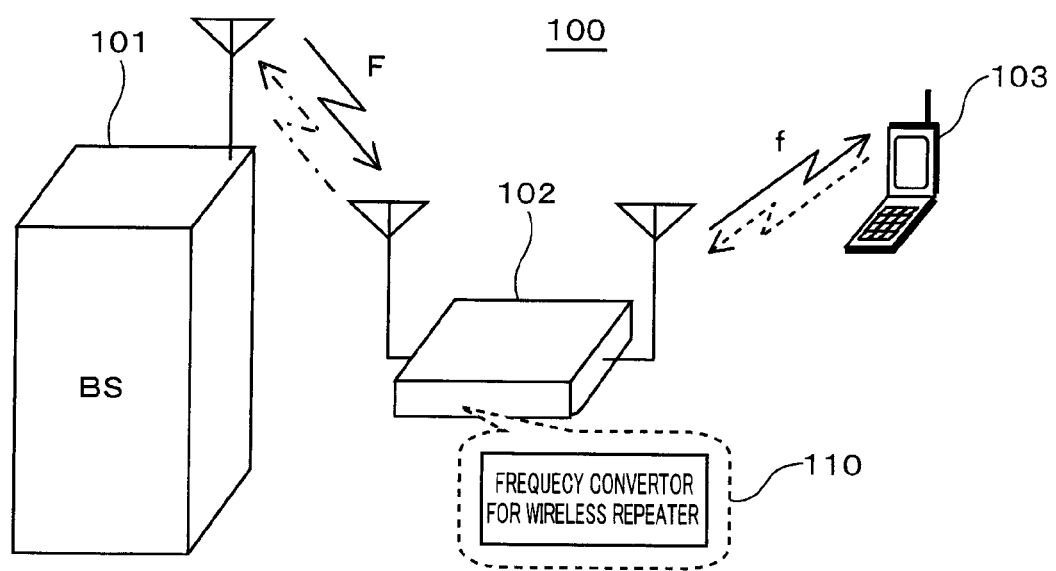
FIG. 1B is a diagram showing an exemplary configuration of a wireless repeating system adopting the frequency converter of the first embodiment.

According to a typical embodiment of the present invention, after a repeating base-station received a radio wave (a first analog signal) wirelessly transmitted from a hub base-station, if a frequency to be transmitted from a wireless repeater to a terminal is low, the frequency of the radio wave is converted to an original digital signal by a first sampling frequency (fi) without modification, and if it is high, after converting it to a frequency lower than the transmission frequency of the wireless repeater via an analog frequency converter, and then zero-interpolation is made between signal points on a sampled time axis by the first sampling frequency at a time interval equivalent to the reciprocal of a second sampling frequency (fos) that is an integral multiple of the first sampling frequency. Then, out of image digital signals generated on the frequency axis as a result thereof, an image digital signal (ft) of a specific frequency is selected, signals other than the selected specific image digital signal are attenuated to a desired level via a digital filter, and the obtained digital signals are input to a delta-sigma modulator. In the delta-sigma modulator, the amplitude of a noise transfer function in a frequency band occupied by the specific image digital signal becomes locally a value close to zero, and the signal transfer function has an inversed characteristic of waveform distortion resulting from a sample hold operation of a comparator contained in a delta-sigma modulator within the frequency band. Then, an output (a second analog signal) of the delta-sigma modulator is input directly to a power amplifier via an analog filter and the output of the power amplifier is radiated to space.

Since, as a result of oversampling, the central frequency of the spectrum of each image digital signal becomes an integral multiple of the central frequency (fi) of the spectrum of the original digital signal, the selection of an appropriate image digital signal will realize frequency conversion to a high frequency signal of the original digital signal. Since the selected image digital signal is converted to an analog signal and radiated to space as radio wave, it is necessary to convert the appropriate image digital signal to an analog signal.

A circuit operative to convert a digital signal to an analog signal is called a digital-analog converter (DAC) and various circuit types have been proposed. Out of them, the delta-sigma type DAC is compatible with the techniques of the invention because this type of DAC oversamples an original digital signal. The delta-sigma type DAC contains a comparator and outputs an analog signal by modulating the amplitude width of a digital signal whose amplitude is the same as that of the analog signal. In the delta-sigma circuit, although noises are newly added to a signal by oversampling operation, the oversampling is capable of not only distributing the noises over wide frequency band but also aggregating the noises distributed over wide frequency band in a specific range, which is called noise-shaping, and thus significantly reducing noises in a certain frequency band. Although digital signal processing must be ideally performed with an impulse waveform that is a pulse waveform with no width, the delta-sigma circuit contains the comparator deals with a pulse with finite width and therefore an output signal undergoes waveform distortion corresponding to Fourier transform of a pulse with infinite width. If the pulse width is sufficiently narrow, the Fourier transform of the pulse has a characteristic almost parallel to the frequency axis, but practically Sinc function type waveform distortion occurs at oversampling frequency as the period. Accordingly, if the frequency band of the selected image digital signal is close to the frequency band of the original digital signal, the waveform distortion can be almost ignored due to the characteristic of Sinc function, but if the frequency band of the image digital signal is close to oversampling frequency (fos), the waveform distortion has unignorably significant effect. Since it is possible to design signal transfer function and noise transfer function separately in the delta-sigma circuit, assuming that the signal transfer function has the property of the reciprocal of a waveform distortion resulting from operation of the comparator within the frequency band of the selected image digital signal, by designing so that the noise transfer function is minimized within the frequency band of the image digital signal via noise shaping, it is possible to address the problem of noise and waveform distortion when selecting the delta-sigma type DAC.

To select a specific image digital signal from a series of image digital signals to be generated by oversampling, it is sufficient to use a digital filter. Since characteristics of the signal transfer function and noise transfer function of the digital filter and the delta-sigma type DAC are determined by the constants of a digital unit comprising the digital filter and delta-sigma circuit, adjustment of these characteristics are realized by changing these constants and it is possible to change the characteristics with software using the same hardware.

According to an embodiment of the invention, it is possible to frequency-convert and then to transmit a signal received by a wireless repeater via a digital circuit without using an analog frequency converter including a mixer and a local oscillator, which is effective for down-sizing the wireless repeater. Also, since it is possible to realize the change of transmission frequency by changing by software the internal constants using the same hardware, the invention can be applied to a system that has a wireless repeater comprising the same hardware and uses different frequencies and also has the effect of reducing the man-hour for development of the hardware as well as the cost of building the system by utilizing existing hardware.

Exemplary embodiments of the invention are described below in detail with reference to the drawings.

Embodiment 1

FIG. 1A is a diagram showing a configuration of a first embodiment of a frequency converter of the invention, and FIG. 1B shows an exemplary configuration of a wireless repeating system adopting the frequency converter of the first embodiment.

A frequency converter 110 includes a sample rate harmonizing circuit 1 (an oversampling unit), a zero-value interpolation circuit 2, an image selection circuit 3, and a digital-analog conversion unit 4, which are cascaded each other. The digital-analog conversion unit 4 includes a noise elimination capability 4A, a waveform equalizing capability 4B, and a DA conversion capability 4C. A first analog signal of reception frequency F is converted to a digital signal via a reception processing unit 5 (an original digital signal generation unit) and input to the frequency converter 110. That is, a first analog signal is digitally converted at a first sampling frequency (fi) to generate an original digital signal via an analog-digital converter (not shown) to be connected to the former stage of the frequency converter 110. Further, the converted digital signal (an original digital signal) is oversampled at a second sampling frequency (fos) higher than the first sampling frequency to generate plural image digital signals. In the zero-value interpolation circuit 2, data point of each image digital signal after oversampling is zero-interpolated. That is, the original digital signal is zero-interpolated between signal points on the time axis at a time interval equivalent to a reciprocal of the second sampling frequency that is an integral multiple of the first sampling frequency. In the image selection circuit 3, an image digital signal occupying the specific frequency band (ft) selected from plural zero-interpolated image digital signals is extracted via the digital filter (ft>fi). In other words, the sample rate harmonizing circuit 1 and the image selection circuit 3 have up-conversion capability. This selected image digital signal is input to the digital-analog conversion unit 4, converted to the second analog signal by performing noise elimination and waveform equalizing for the image digital signal of the selected frequency, and then output.

That is, in the original digital signal input to the sample rate harmonizing circuit 1, plural new data points are formed between the signal sequence on the time axis, zero data is defined at the plural data points by the zero-interpolation circuit 2, and as many as multiple of sample rate spectrum of the same shape of that of the original digital signal are reproduced as image digital signals. Out of these image digital signals, specific one is selected and extracted by the frequency axis image selection circuit 3, noise elimination and waveform shaping are performed for this signal by the digital-analog conversion unit 4 to convert to signals that transmit information minimizing noises in the occupied frequency band of the image digital signal. Further, this image digital signal is DA-converted and a second analog waveform of frequency f (≠F) from a transmitter 6.

According to this embodiment, it is possible to frequency-convert a digital signal of frequency F corresponding to the first analog signal and output it as the second analog signal of frequency f, via a frequency converter 110 configured without an analog frequency conversion circuit including the mixer and local oscillator or an analog frequency conversion circuit including the mixer and local oscillator or a digital frequency conversion circuit.

FIG. 1B shows an example of a wireless repeating system to which the frequency converter 110 of this embodiment is applied. The wireless repeating system 100 includes a base-station (BS) 101, a wireless repeater (a frequency conversion repeater) 102 having frequency conversion capability, and plural wireless terminals (TS) 103. The wireless terminal 102 transmits/receives a first analog signal of frequency F to/from the base-station (BS) 101, and transmits/receives a second analog signal to/from the wireless terminal (TS) 103. The frequency converter 110 is capable of converting an analog waveform of frequency f to a digital signal of frequency (this is true of the other embodiments described below).

By adopting the frequency converter 110 of this embodiment, it is possible to perform frequency conversion arbitrarily by selecting, via the frequency axis image selection circuit 3, an image digital signal of arbitrary frequency band from an image digital signal having plural different frequency bands generated by oversampling. This is effective for downsizing and cost reduction of the wireless repeater 102. Also, this makes possible to realize a transmitter having different transmit frequencies with the same hardware and is effective for reduction of man-hour for designing a wireless repeater having frequency conversion capability corresponding to a wireless system using different frequencies.

Embodiment 2

Figure 2:
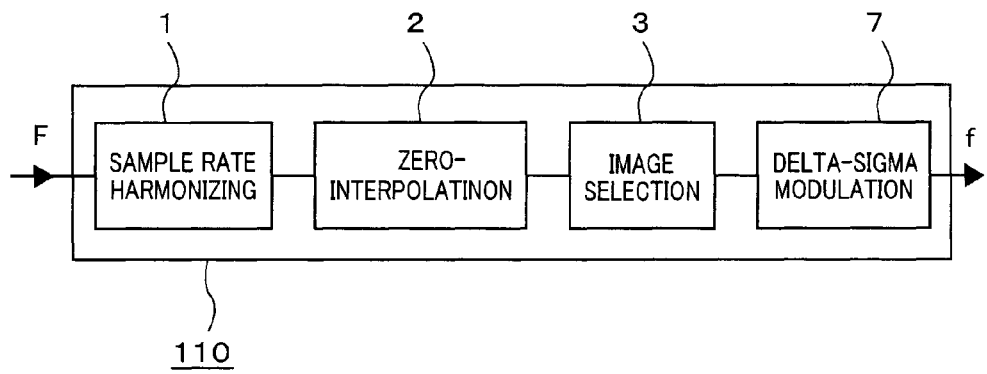
FIG. 2 is a block diagram of a frequency conversion delta-sigma transmitter of a second embodiment of the present invention.

FIG. 2 is a diagram showing the second embodiment of a frequency converter of the present invention. This frequency converter differs from the frequency converter in FIG. 1A in that the digital-analog conversion unit 4 is replaced by a delta-sigma modulation circuit 7. The frequency converter 110 is composed of the sample rate harmonizing circuit 1, the zero-value interpolation circuit 2, the image selection circuit 3, and the delta-sigma modulation circuit 7, which are cascaded each other. An original digital signal of frequency F input to the sample rate harmonizing circuit 1 forms plural data points between the signal sequence of time axis, zero data is defined at the plural data points by the zero-value interpolation circuit 2, and as many as a multiple of sample rate of spectrums are reproduced that have the same shape of the spectrum of the original digital signal. Out of these plural image digital signals, a specific one is extracted by the frequency axis image selection circuit 3 and then, via the delta-sigma modulation circuit 7, noises are minimized in the occupied frequency band of the image digital signal, the width of a square wave at a constant amplitude with small digital-analog conversion distortion is modulated, and a second analog waveform of frequency f is output that transmits the information held by the signal.

According to this embodiment, it is possible to frequency-convert a digital signal of frequency F and output it as the second analog signal of frequency f, via a local oscillator or frequency converter 110 configured without an analog frequency conversion circuit comprising the mixer and a digital frequency conversion circuit. By adopting the frequency converter 110 of this embodiment, it is possible to perform frequency conversion arbitrarily by selecting, via the frequency axis image selection circuit 3, an image digital signal of arbitrary frequency band from an image digital signal having plural different frequency bands generated by oversampling. This is effective for downsizing and cost reduction of the wireless repeater 102. This is also effective for reducing man-hour of designing a wireless repeater having frequency conversion capability corresponding to a wireless system using different frequencies since it is possible to realize the frequency conversion of a transmit waveform by changing the constants of the frequency axis image selection circuit 3 and the delta-sigma modulation circuit 5.

Embodiment 3

Figure 3:
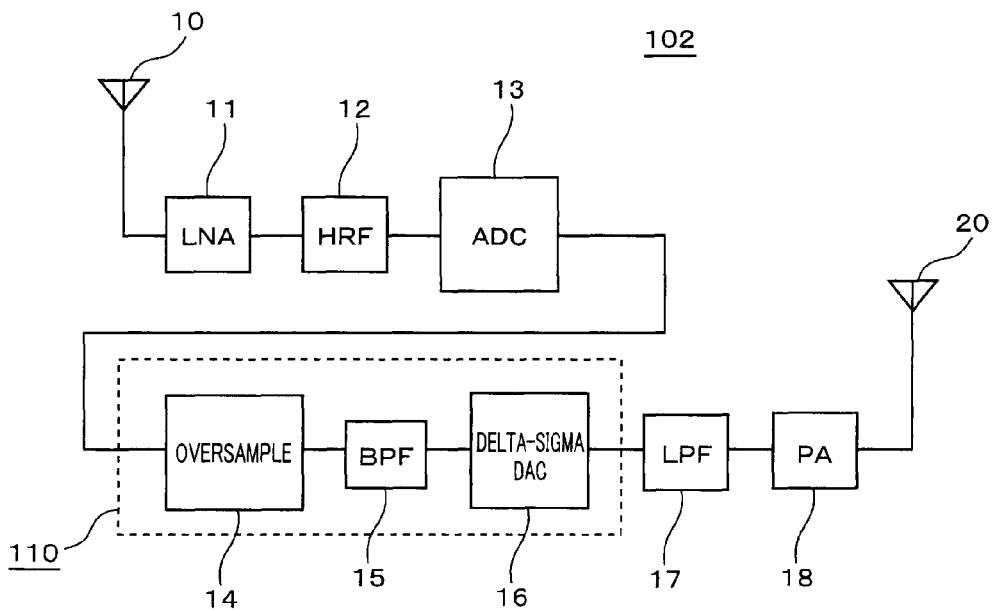
FIG. 3 is a block diagram of a wireless repeater of a third embodiment of the present invention using the frequency conversion delta-sigma transmitter.

FIG. 3 is a diagram showing an exemplary configuration of a wireless repeater of a third embodiment of the present invention. The wireless repeater 102 includes a receive antenna 10, a low-noise amplifier 11, a high rejection filter 12, an analog-digital converter (ADC) 13, a frequency converter 110, a low pass filter 17, a power amplifier 18, and a transmit antenna 20, which are cascaded. The frequency converter 110 includes an oversampler 14, a band-pass filter 15, and a delta-sigma type digital-analog converter 16, which are cascaded. In this embodiment, the frequency conversion delta-sigma conversion circuit 7 of the second embodiment is used for the delta-sigma type digital-analog converter 16.

A first analog signal input from the receive antenna 10 is amplified by the low-noise amplifier 11, unwanted high-frequency components are eliminated form the signal in order to prevent the generation of an alias that hinders digital-analog conversion when analog-digital conversion is performed by the high rejection filter 12, and converted to an original digital signal by a first sampling frequency via the ADC 13. In the frequency converter 110, the oversampler 14, the band-pass filter 15 and the delta-sigma type DAC 16 realize the series of operation described in the embodiment 2 and output a second analog signal of frequency f. An analog signal that is a low-amplitude pulse with modulated width obtained via the frequency converter 110 is passed through the low-pass filter 17 to eliminate unwanted multiple components included in the analog signal, the output is increased via power amplifier, and the waveform is radiated in space to a terminal from the transmit antenna 20.

This embodiment makes it possible to realize a wireless repeater having frequency conversion capability with the frequency converter 110 configured without an analog frequency conversion circuit including a mixer and a local oscillator or a digital frequency conversion circuit, which is effective for down-sizing and cost reduction of the wireless repeater. Also, this makes possible to realize a transmitter having different transmit frequencies e with the same hardware and is effective for reduction of man-hour for designing a wireless repeater having frequency conversion capability corresponding to a wireless system using different frequencies.

Embodiment 4

Next, an exemplary wireless repeating system of a fourth embodiment of the present invention is described with reference to FIGS. 4A through 10B. The wireless repeating system includes a hub base-station 101 and a wireless repeater 102.

Figure 4A:
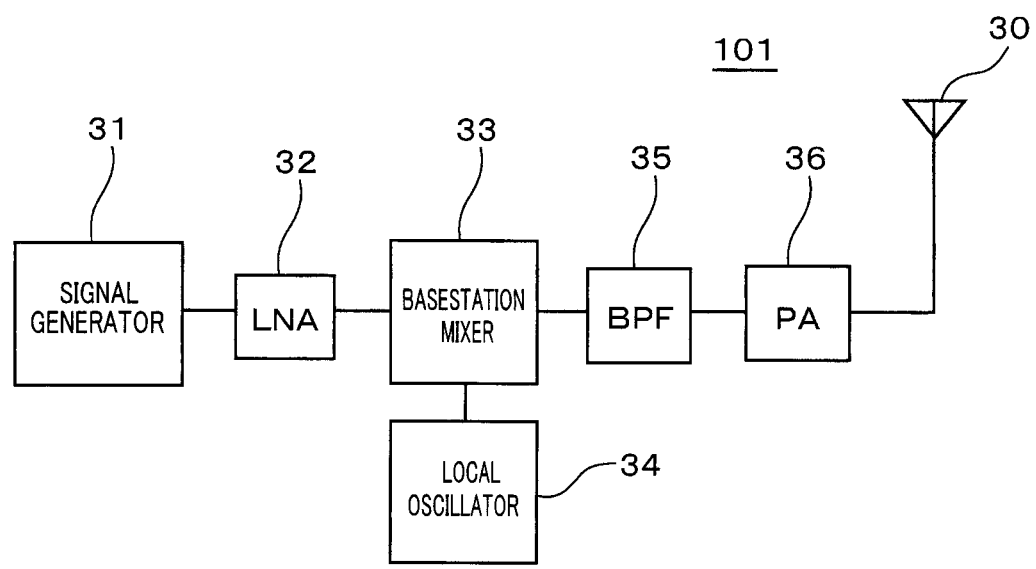
FIG. 4A is a block diagram of a hub base-station used for a wireless repeating system of a fourth embodiment of the present invention.

FIG. 4A is a diagram showing an exemplary configuration of the hub base-station of the wireless repeating system. The hub base-station 101 comprises a signal generator 31, a base-station low-noise amplifier 32, a base-station mixer 33 coupled to a base-station local oscillator 34, a base-station band-pass filter 35, a base-station power amplifier 36, and a base-station transmit antenna 30, which are cascaded. A signal to be repeated by the system is generated by the signal generator 31, its power is amplified with a few noises added by the base-station low-noise amplifier 32, the frequency is boosted to wireless frequency by the frequency converter composed of the base-station oscillator 34 and the base-station mixer 33, all the unwanted frequency components unable to be radiated to space are suppressed by the base-station band-pass filter 35, power is amplified by the base-station power amplifier 36, and radio waves are radiated toward a wireless repeater from the base-station transmit antenna 30.

Figure 4B:
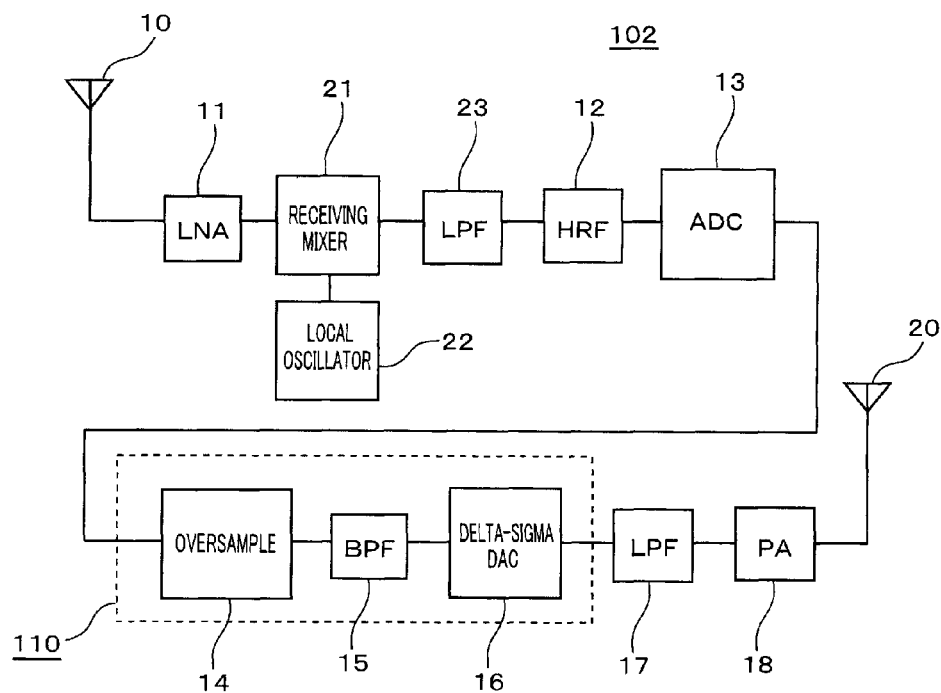
FIG. 4B is a block diagram of the wireless repeater used for the wireless repeating system of the fourth embodiment.

Although the embodiment in FIG. 3 may be adopted as a wireless repeater, the wireless repeater 102 shown in FIG. 4B is adopted here.

FIG. 4B is a diagram showing an exemplary configuration of the wireless repeater using a frequency conversion delta-sigma transmission circuit of the fourth embodiment. The wireless repeater 102 in FIG. 4B differs from the embodiment in FIG. 3 in that a mixer 21 coupled to a local oscillator 22 and a second low-pass filter 23 are inserted between the low-noise amplifier 11 and the high rejection filter 12. Signals amplified by the low-noise amplifier 11 are converted to a frequency lower than the original signal and that higher than the original signal by the frequency of the local oscillator via an analog frequency conversion circuit composed of the mixer 21 and the local oscillator 22, the former is selected by the second low-pass filter 23, and the signal converted to a low frequency is input to the ADC 13 via the high rejection filter 12. According to the configuration in FIG. 4B, it is possible to realize the same effect as in the embodiment 2 when the frequency to be transmitted by the wireless repeater 102 is lower than the frequency received by the wireless repeater.

Figure 5:
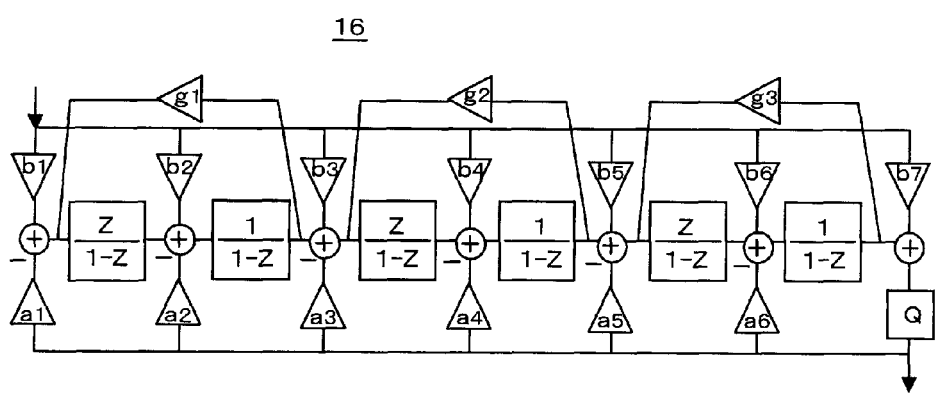
FIG. 5 is a digital block diagram of a delta-sigma DAC of the fourth embodiment.

FIG. 5 is a diagram showing an exemplary configuration of a digital circuit block of the delta-sigma type digital-analog converter 16 of this embodiment. In this circuit block, a non-delay circuit $Z/(1-Z)$ and a delay circuit $1/(1-Z)$ are six-stage cascaded alternatively via a compositor (+). To each compositor, an input signal is weighted and feed-forward-added via constant multipliers b1 to b7, an output signal is weighted and feedback-subtracted via the other constant multipliers a1 to a6, an output of the delay circuit at the last cascade stage quantized and become output Q via a comparator that is a quantizer. Weighting local feedback loops g1 to g3 are formed on the route of the non-delay circuit $Z/(1-Z)$, the compositor, and the delay circuit $1/(1-Z)$, forming a circuit configuration called Cascade Resonator Feed-forward Feedback (CRFF).

Figure 6:
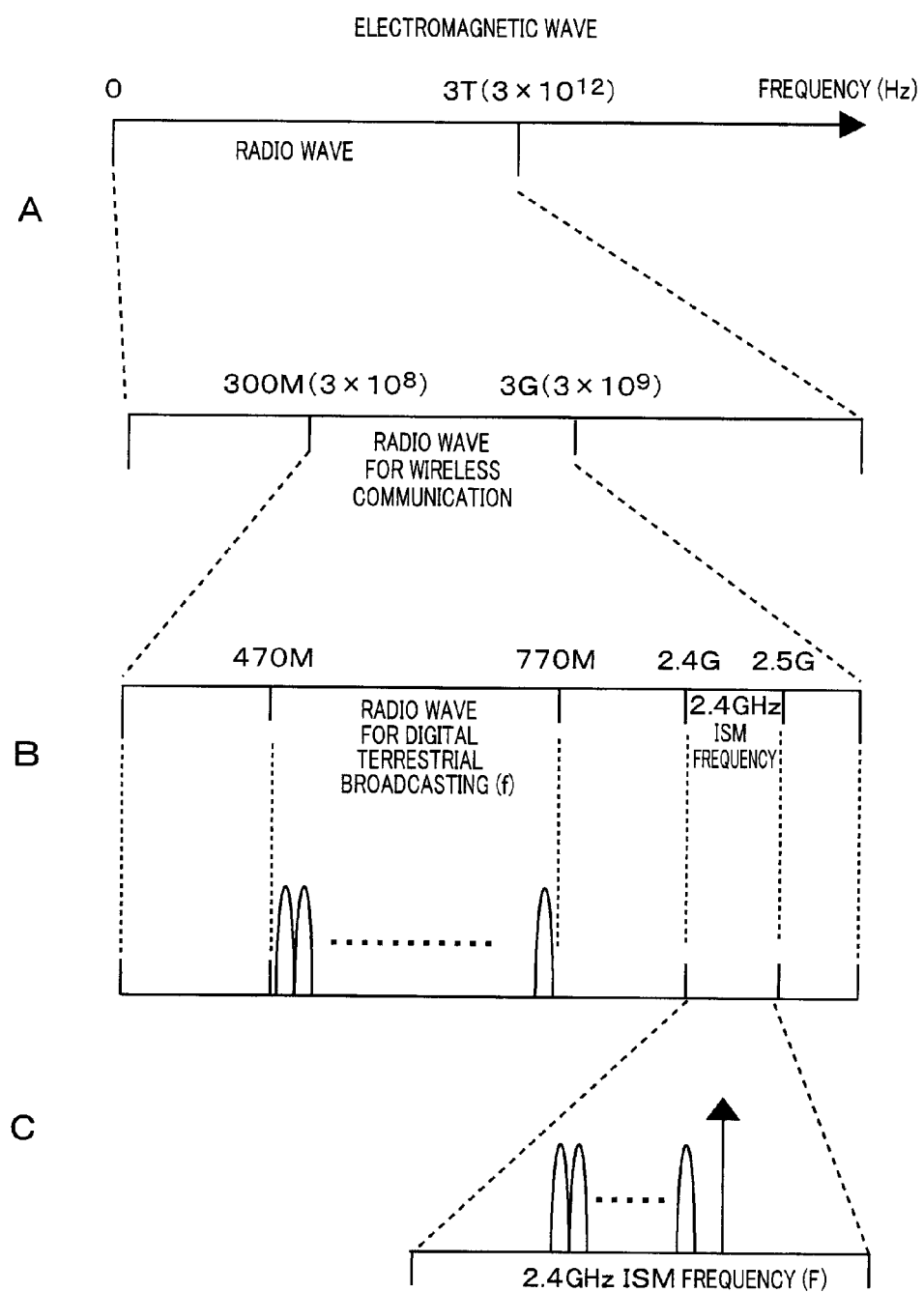
FIG. 6 is a diagram showing the frequencies of electromagnetic waves used for reception and transmission in the present invention.

Here, relationship among frequencies of electromagnetic waves to be used for transmission and reception in each embodiment of the present invention is shown in FIG. 6. Wavelength of the electromagnetic waves is 3 THz or below and frequencies suitable for wireless communications are in the range of 300 MHz to 3 GHz. Frequencies of radio waves for terrestrial digital broadcasting are 470 MHz to 770 MHz. In this invention, frequency F of 2.4 GHz to 2.5 GHz, i.e. ISM band (Industry Science Medical band) is used for communications between the base-station and the wireless repeater, and frequency f of 470 MHz to 770 MHz is used for communications between the wireless repeater and the terminal. It should be noted that some countries use other frequency bands as frequency band equivalent to the ISM band and it is desirable to use these bands as frequency F in such countries.

FIGS. 7A-7E are diagrams illustrating the operation of the wireless repeating system of the fourth embodiment, using frequency spectrum. That is, FIGS. 7A-7E show the frequency spectrum of a signal of each unit of the hub base-station and the wireless repeater in FIGS. 4A and 4B.

Figure 7A:
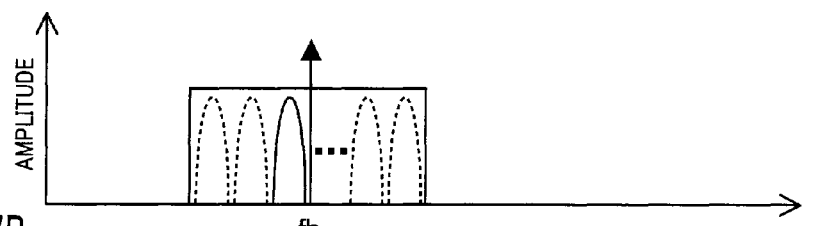
FIG. 7A is a frequency spectrum illustrating the operation of the wireless repeating system of the fourth embodiment.
Figure 7B:
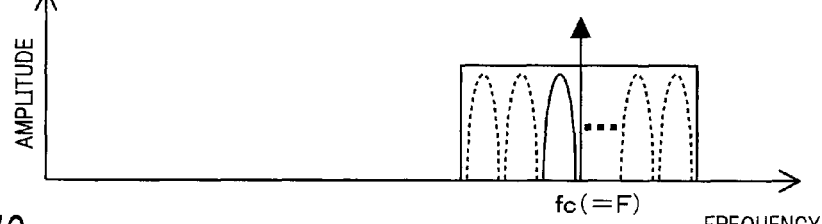
FIG. 7B is a frequency spectrum illustrating the operation of the wireless repeating system of the fourth embodiment.

FIG. 7A is a signal generated from signal generator 31 where plural spectra occupying a narrow frequency band are located that includes the information of plural contents themselves called channels centering on carrier frequency fb, 600 MHz for example. The hub base-station 101 converts carrier wave fb to another frequency fc (=F, 2.4 GHz for example) in order to avoid interference with other base-stations (wireless repeaters) broadcasting the same content using carrier frequency fb. With this, spectra in channels undergo the same frequency conversion and the whole frequency spectrum moves to higher frequency F with maintenance of its shape. A signal having spectrum of FIG. 7B is transmitted from the hub base-station 101 via the transmit antenna 30 and the wireless repeater 102 receives spectrum of FIG. 7B from the receive antenna 10.

The wireless repeater 102 converts a signal of carrier frequency fc (=F) corresponding to a first analog signal to a signal of frequency allowing analog-digital conversion. At this time, it is not necessary to convert frequencies of all channels included in the received signal, all that needed is to move only the frequency band including some plural channels out of all channel including channels in which signals are actually transmitted (the solid line in FIG. 7B) to predetermined frequency band fi by frequency conversion.

Figure 7C:
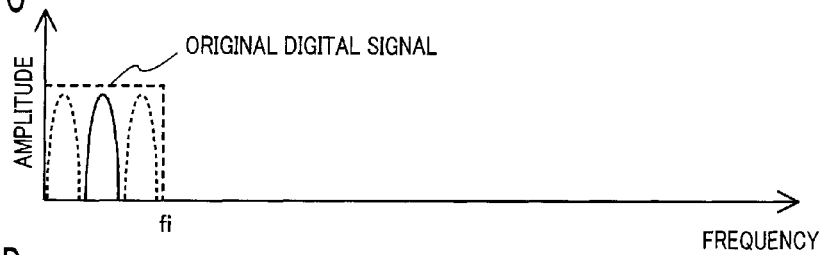
FIG. 7C is a frequency spectrum illustrating the operation of the wireless repeating system of the fourth embodiment.
Figure 7D:
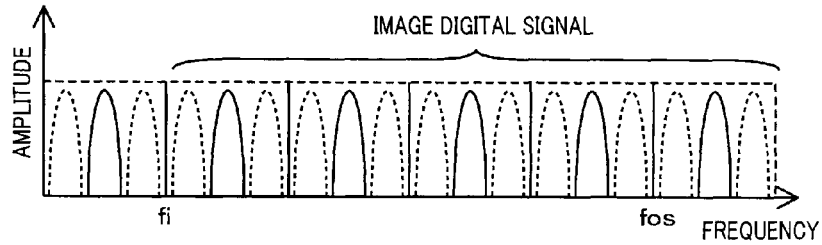
FIG. 7D is a frequency spectrum illustrating the operation of the wireless repeating system of the fourth embodiment.

In the signal moved to frequency fi in this way, all radio wave components of unwanted frequency band including channels in which signals are not transmitted are eliminated by the high rejection filter 12, become the original digital signal (the first sampling frequency fi, 20 MHz for example) of the spectrum in FIG. 7C, and then input to the ADC 13. In the frequency converter (the digital signal processing unit) 110 inside the wireless repeater 102, the digital signal of FIG. 7C spectrum is multiplied by oversampling via the oversampler 14 to generate image digital signals whose number is an integral multiple of the ratio between the oversampling frequency (a second sampling frequency) fos and the first sampling frequency fi, and the spectrum of FIG. 7D is generated. As a specific example, in FIG. 7D, an original digital signal of 20 MHz is sextupled to generate five new image digital signals of 40 MHz to 120 MHz. Practically, increased number of imaged digital signals are generated.

Figure 7E:
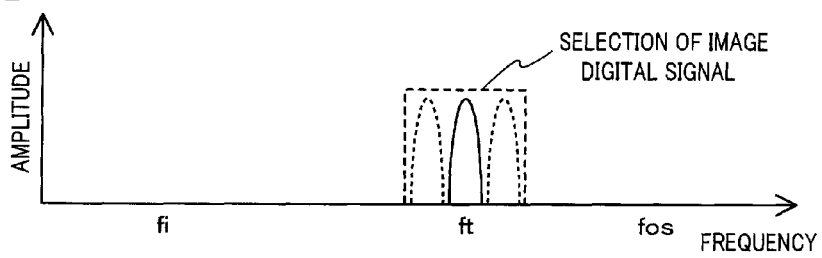
FIG. 7E is a frequency spectrum illustrating the operation of the wireless repeating system of the fourth embodiment.

Finally, from these multiple image digital signals, only the spectrum of an image signal of required selection frequency ft, 80 MHz for example, is selected, and the spectrum of FIG. 7E, i.e. the selected image digital signal of 80 MHz is obtained. It goes without saying that any one selection frequency ft or multiple selection frequency ft can be selected by changing the characteristics of the band-pass filter 15.

The spectrum of FIG. 7E is input to the delta-sigma type DAC 16, unwanted multiplication components included in an analog signal are eliminated by the low-pass filter 17, the output is amplified by the power amplifier 18, and radiated to space as a second analog signal from the transmit antenna 20 of the wireless repeater.

Figure 8A:
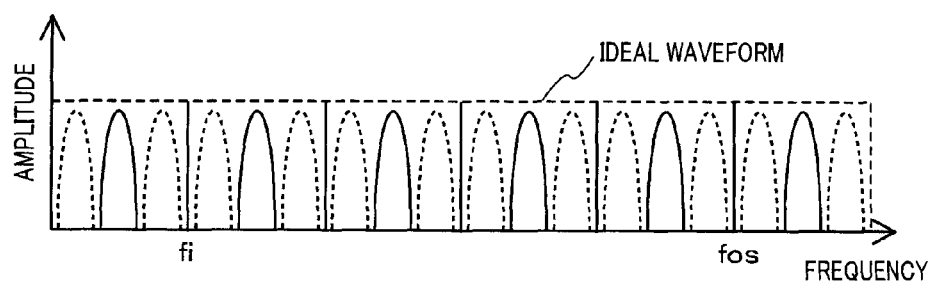
FIG. 8A is a frequency spectrum illustrating the operation of the wireless repeating system of the fourth embodiment.
Figure 8B:
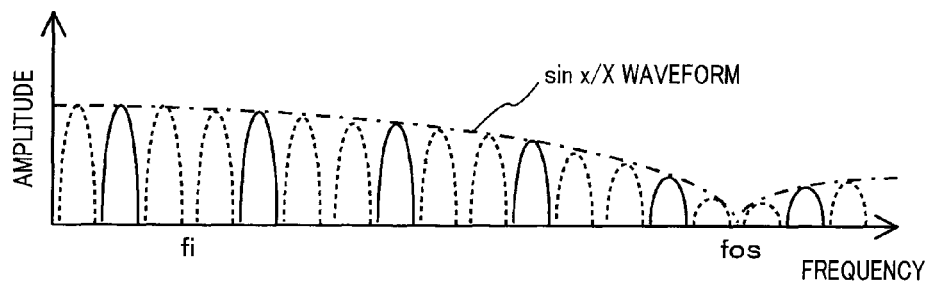
FIG. 8B is a frequency spectrum illustrating the operation of the wireless repeating system of the fourth embodiment.

Next, capabilities of the delta-sigma type DAC 16 located at the latter stage of oversampling. FIGS. 8A and 8B are diagrams illustrating the operation of an ordinary frequency conversion delta-sigma transmission circuit. FIG. 8A shows the state of ideal digital signal processing, in which there is no waveform distortion over all oversampling frequency bands and maximum amplitude is constant. FIG. 8B shows the state of a digital signal processing performed in an actual device. That is, FIG. 8B shows how a pulse waveform of finite width, called zero hold effect, of a comparator of the delta-sigma circuit causes waveform distortion in the digital signal processing. As shown in FIG. 8B, oversampled image digital signals whose number is integral multiple of the ratio between the oversampling frequency (fos) and the sampling frequency of the ADC undergo Sinc function distortion that is Fourier transform of a pulse waveform and the waveform undergoes large distortion at the selected and multiplied frequency ft and around it. In the delta-sigma circuit, it is necessary to realize a waveform of signal transfer function of inversed characteristic of the distortion for correcting the distortion.

Accordingly, the delta-sigma type DAC 16 of this embodiment has a capability to correct the above-mentioned distortion in the oversampled frequency band.

Figure 9A:
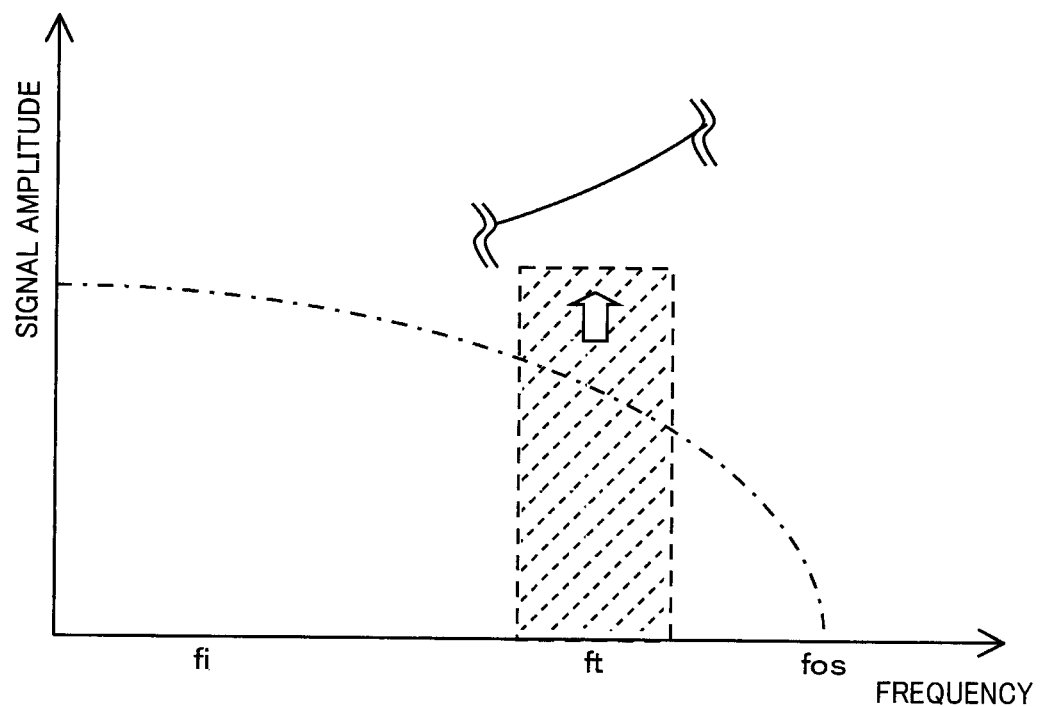
FIG. 9A is a frequency spectrum illustrating the operation of the frequency conversion delta-sigma transmitter of the fourth embodiment.
Figure 9B:
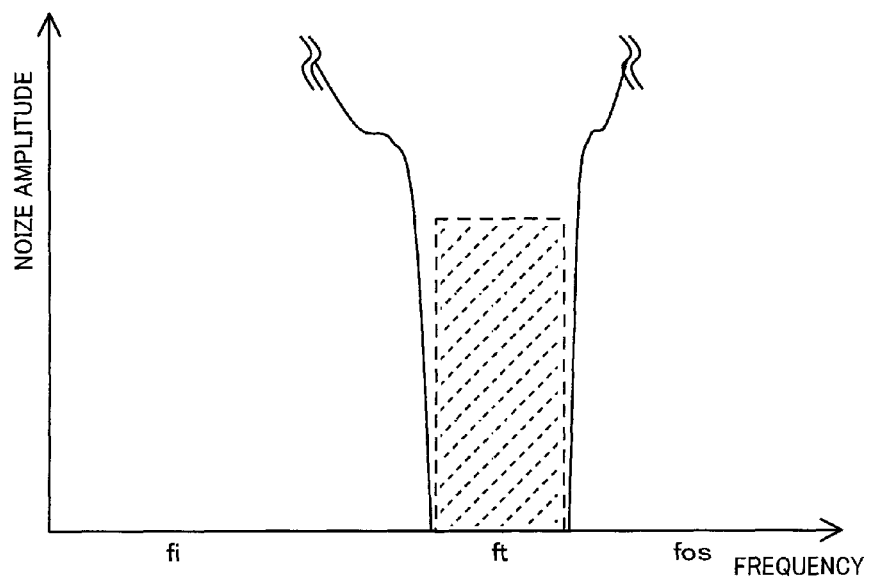
FIG. 9B is a frequency spectrum illustrating the operation of the frequency conversion delta-sigma transmitter of the fourth embodiment.

The operation of the delta-sigma type DAC in FIG. 5 is described with reference to FIGS. 9A and 9B. FIGS. 9A and 9B show frequency spectrum illustrating the operation of the frequency conversion delta-sigma transmission circuit of the fourth embodiment. In the circuit configuration of FIG. 5, by adjusting weighting coefficients a1 to a6 and b1 to b7, it is possible to realize a signal transfer function shown by a dotted rectangle in FIG. 9A, as the signal transfer function for the delta-sigma circuit. Also, in the circuit configuration of FIG. 5, by adjusting weighting coefficients a1 to a6 and g1 to g3, it is possible to realize a noise transfer function with characteristic shown by a dotted rectangle in FIG. 9B.

Figure 10A:
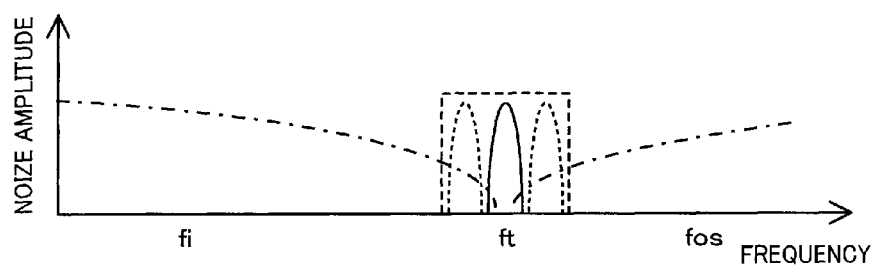
FIG. 10A is a frequency spectrum illustrating the action and effect of the wireless repeating system of the fourth embodiment.

FIG. 10A is a frequency spectrum illustrating the action and effect of the wireless repeating system of the fourth embodiment. Out of image digital signals generated on the frequency axis, an image digital signal (ft) of a specific frequency is selected, signals other than the selected specific image digital signal are attenuated to a desired level by a digital filter i.e. the band-pass filter 15, and the obtained image digital signal is input to the delta-sigma type DAC 16. Since characteristics of the signal transfer function and noise transfer function of this digital filter and the delta-sigma type DAC 16 are determined by the constants of the digital unit constituting the digital filter 15 and the delta-sigma type DAC 16, adjustment of these characteristics is realized by changing the same constants, and it is possible to change these characteristics with software using the same hardware. That is, in the delta-sigma type DAC 16, since the signal transfer function and the noise transfer function can be separately designed, assuming that the signal transfer function has the property of a reciprocal of a waveform distortion resulting from the operation of a comparator in the frequency band of the selected image digital signal, it is possible to design so that the noise transfer function is minimized in the frequency band of the image digital signal by noise-shaping.

Figure 10B:
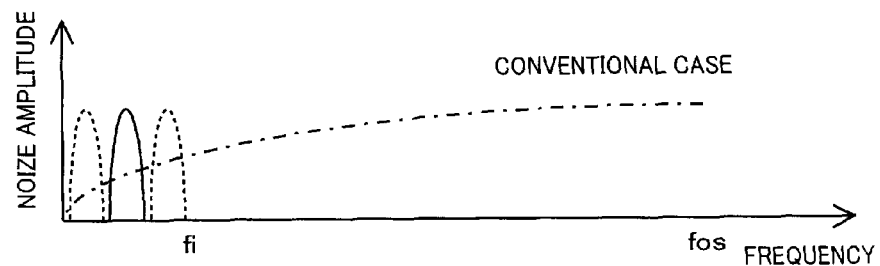
FIG. 10B is a frequency spectrum illustrating the operation of an ordinary delta-sigma converter.

On the other hand, FIG. 10B is a frequency spectrum illustrating the operation of an ordinary delta-sigma modulation circuit shown for comparison. In the ordinary delta-sigma modulation circuit, noise-shaping in frequency band of sampling frequency fi is mainly performed. If the frequency band of an image is close to oversampling frequency (fos), the effect of its waveform distortion is unignorably large. Therefore, in the ordinary delta-sigma modulation circuit, multiplied and selected frequency ft and nearby noise-shaping are not sufficient.

According to this embodiment, problems of noise increase and waveform distortion arising when adopting a delta-sigma type DAC performing frequency conversion action can be addressed by using image digital signals generated by oversampling.

Also, according to this embodiment, since signals from a hub base-station can be transmitted to a wireless repeater in the wireless repeating system, it is possible to reduce the transmission hardware, such as RF cables, between the hub base-station and the wireless repeater when installing the system, and also to reduce man-hour for installation of the wireless repeating system, increase the freedom of device installation location, and reduce system maintenance cost.

Also, a signal received by the wireless repeater can be frequency-converted via a digital circuit and transmitted without using an analog frequency modulator composed of a mixer and a local oscillator, which is effective for downsizing the wireless repeater. Further, since transmission frequency can be changed with software by changing constants in the same hardware, it is possible to apply this embodiment to a system that has a wireless repeater of the same hardware and uses different frequencies, thus reducing man-hour for development of the hardware and also reducing the cost of building the system by utilizing existing hardware.

Embodiment 5

Figure 11:
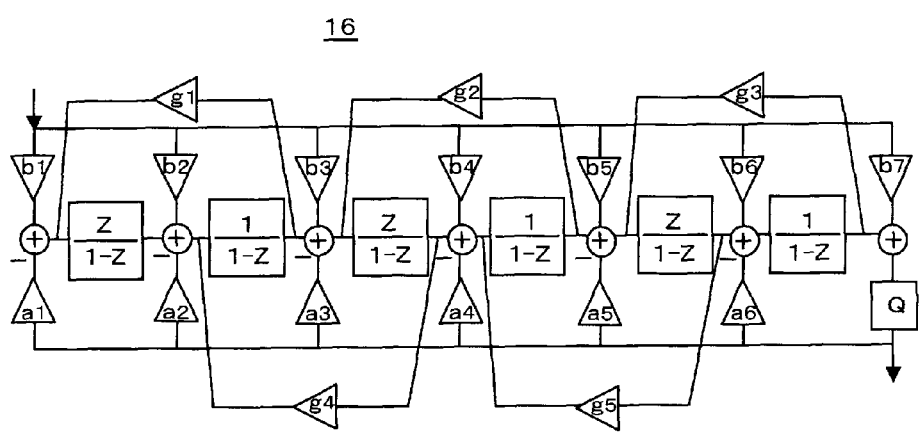
FIG. 11 is a digital block diagram of a frequency conversion delta-sigma transmitter of a fifth embodiment of the present invention.

FIG. 11 is a diagram showing another embodiment of the digital circuit block configuration of a frequency conversion delta-sigma type DAC 16 of the present invention. This differs from the embodiment of FIG. 5 in that a weighting local feedback loop g4 to g5 is newly formed on the alternatively cascaded route of the delay circuit 1/(1−Z), the compositor (+), and the non-delay circuit Z/(1−Z). This embodiment increase calculation freedom when deciding a weighting coefficient of the digital circuit block and is therefore effective for reduction of man-hour for design of the digital circuit block of the frequency conversion delta-sigma transmission circuit.

Embodiment 6

Figure 12:
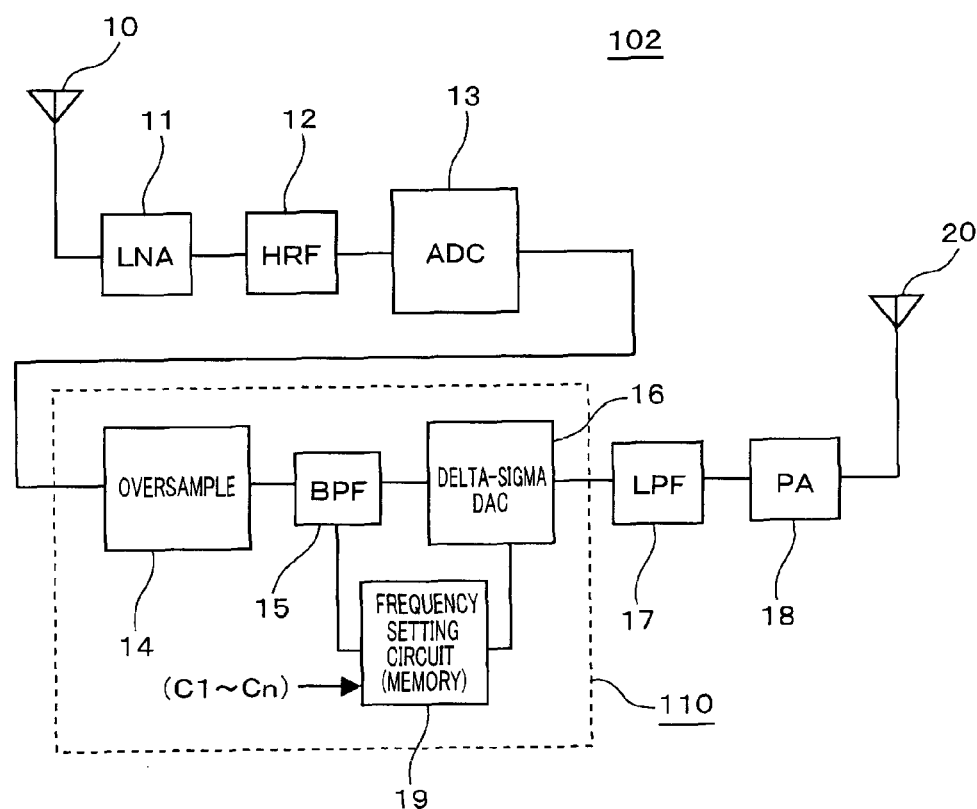
FIG. 12 is a block diagram of a hub base-station used for a wireless repeating system of a sixth embodiment of the present invention.

FIG. 12 is a diagram showing still another embodiment of a wireless repeater using the frequency conversion delta-sigma transmission circuit of the present invention. This differs from the embodiment of FIG. 3 in that a frequency setting circuit 19 is coupled to the band-pass filter 15 and the delta-sigma type DAC 16. As described in the fourth embodiment of the invention, for example, for changing the frequency at which the delta-sigma type transmission circuit, it is necessary to change the frequency characteristic of the filter that selects an image digital signal to be input to the delta-sigma type DAC 16 and to match a frequency band having inversed distortion characteristic of a signal transfer function of the delta-sigma circuit in the frequency band of the image digital signal and a frequency band where the noise transfer function has a minimum value. Accordingly, addition of the frequency setting circuit 19 having a capability to change constants of the digital circuit block of the band-pass filter 15 and the delta-sigma type DAC 16 to the circuit block thereof allows control of the conversion frequency.

This embodiment make it possible to realize a transmission circuit having different transmission frequencies with the same hardware and is effective for reducing man-hour for designing a wireless repeater having a frequency conversion capability corresponding to a wireless system using different frequencies.

Embodiment 7

Next, a wireless repeater of the seventh embodiment of the present invention is described with reference to FIGS. 13 through 17B. The wireless repeating system includes the hub base-station 101 and the wireless repeater 102.

Figure 13:
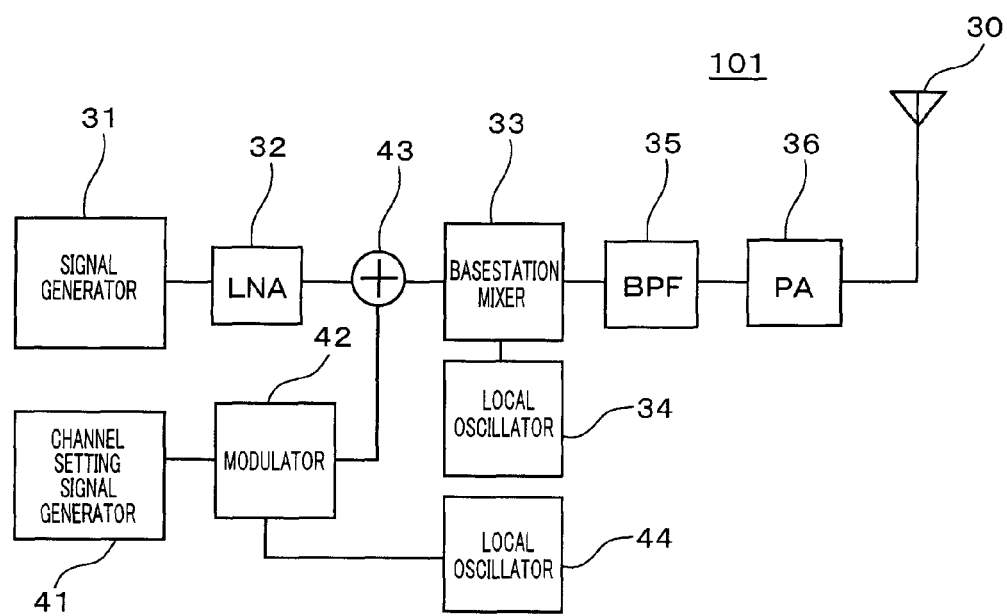
FIG. 13 is a diagram showing an exemplary configuration of a hub base-station of a seventh embodiment of the present invention.

FIG. 13 shows an exemplary configuration of the hub base-station 101 of this embodiment. This differs from the embodiment of FIG. 4A in that the hub base-station 101 in FIG. 13 is additionally provided with a channel setting signal oscillator 41, its output is converted by a modulator 42 coupled to the second local oscillator to a frequency near the frequency band of a signal generated by the signal generator 31, and the frequency-converted output is superimposed on a signal generated by the signal generator 31 via a composition circuit 43.

Figure 14:
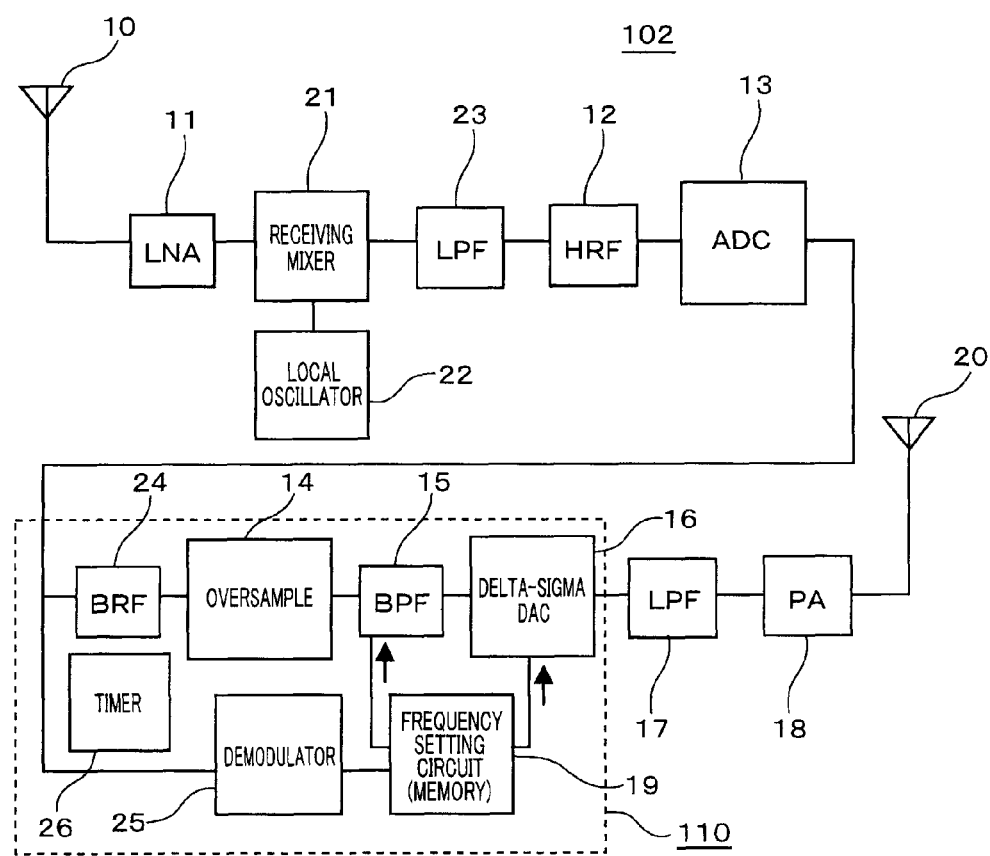
FIG. 14 is a block diagram of the wireless repeater used in the wireless repeating system of the seventh embodiment.

FIG. 14 is a diagram showing a configuration of the wireless repeater 102 of the seventh embodiment. This differs from the embodiment of FIG. 4B in that, in the frequency converter 110 of the wireless repeater 102, portions of an input signal to a band rejection filter 24 are branched and input to a demodulator 25, output of the demodulator 25 is coupled to the band-pass filter 15 and the delta-sigma type DAC 16, and a timer 26 is coupled to the demodulator 25. In this configuration, the demodulator 25 inputs content signal in the frequency band of a channel included in the received signal and the demodulation result of a channel setting signal located outside of the frequency band of the channel, as a control signal for the frequency setting circuit 19 that varies digital circuit block constants related to determination of transmission wave frequency. According to this configuration, it is possible to previously interpose, on a signal to be received by the wireless repeater, a signal that specifies the frequency band of an image to be selected by the frequency conversion delta-sigma transmission circuit and, using this signal, make the transmission frequency of the wireless repeater variable. Thus, the transmission frequency of the wireless repeater can be wirelessly controlled externally and therefore it is possible to reduce the man-hour required for changing the transmission frequency of the wireless repeater.

Figure 15:
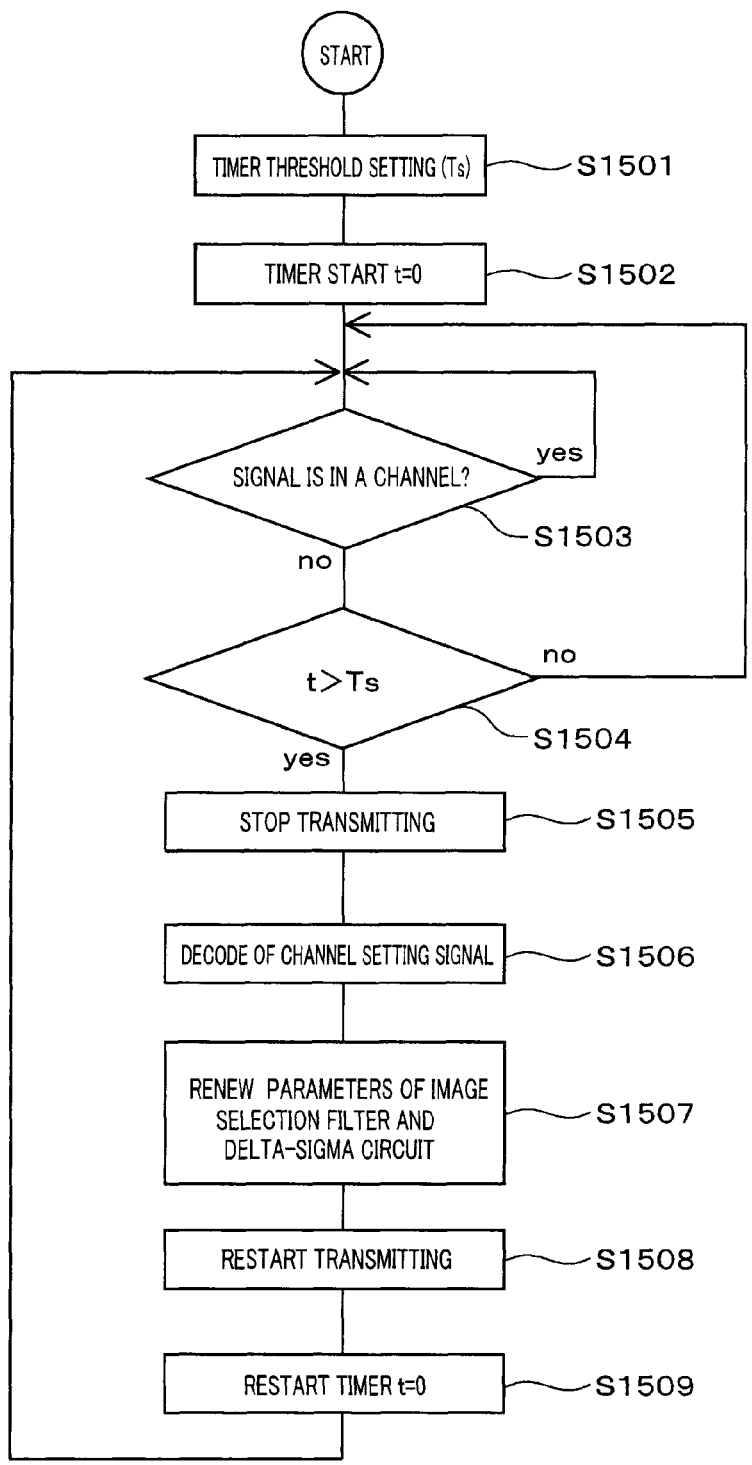
FIG. 15 is a flowchart showing the operation of the wireless repeater of the seventh embodiment.

FIG. 15 is a flowchart illustrating the operation of the wireless repeater 102 of the wireless repeating system 100 that have the hub base-station 101 shown in FIG. 13 and the wireless repeater 102 shown in FIG. 14. Timer threshold Ts is previously set in the wireless repeater 102 for conditioning timer operation (S1501). A wireless repeater receives a radio signal from a hub base-station, and if a signal is present in the frequency band of a channel of the received radio signal, the operation of the wireless repeater is not changed (S1502, S1503). If no signal is present in the frequency band of the channel time of the timer is checked, and if time of timer is smaller than Ts, no change is made to the operation of the wireless repeater (S1504), but if it is larger than Ts, output of the wireless repeater is stopped (S1505). The channel setting signal is decoded (S1506), constants of an image selection filter and a delta-sigma circuit are renewed (S1507), and a transmission frequency of the wireless repeater is maintained or changed and the transmission is restarted (S1508). At the same time, time of the timer is set to zero to start the operation of the timer (S1509).

Figure 16A:
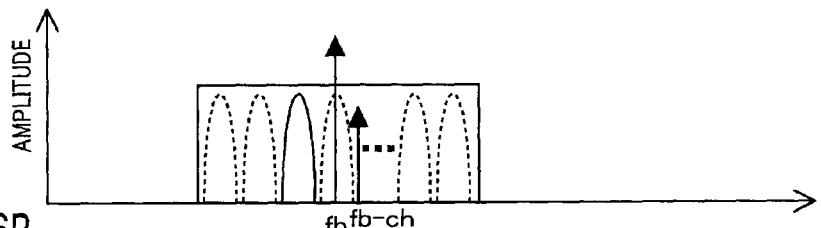
FIG. 16A is a frequency spectrum illustrating the operation of a wireless repeating system of the seventh embodiment.
Figure 16B:
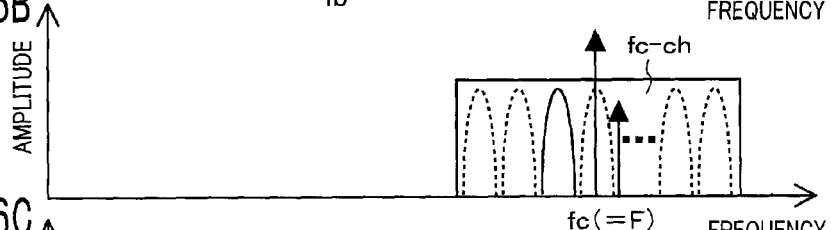
FIG. 16B is a frequency spectrum illustrating the operation of the wireless repeating system of the seventh embodiment.

FIGS. 16A-16F are a diagram illustrating the operation of the seventh embodiment and show the frequency spectrum of the hub base-station and the units of the wireless repeater shown in FIGS. 13 and 14. FIG. 16A is a signal generated from a signal generator and plural spectra occupying a narrow frequency band called a channel that includes the information on content itself is located around carrier frequency fb, and a channel setting signal is inserted in a gap between the channels at frequency fb-ch. When the hub base-station converts carrier frequency fb to another frequency fc (=F), spectra in the channel undergo the same frequency conversion and, as shown in FIG. 16B, all frequency spectra move to higher frequency while maintaining their shapes. A signal having the spectrum of FIG. 16B is transmitted from the hub base-station via the transmit antenna 30 and the wireless repeater receives the spectrum of FIG. 16B from the receive antenna 10. The wireless repeating system converts a first analog signal at carrier frequency fc (=F) to a first frequency fi that is AD convertible. At this time, it is not necessary to convert the frequencies of signals of all the channels, but channel setting signals to be received a frequency fc-ch must be moved to a first frequency band of fi by the frequency conversion.

Figure 16C:
FIG. 16C is a frequency spectrum illustrating the operation of the wireless repeating system of the seventh embodiment.

The signal moved to a basic frequency in this way is input to the ADC 13, after all radio wave components in unwanted frequency band, including channels in which no signal is transmitted, are eliminated by the high rejection filter 12 and input to the ADC 13 after converting to an original digital signal of spectrum of FIG. 16C.

Figure 16D:
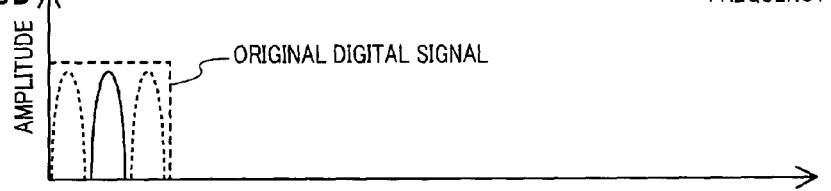
FIG. 16D is a frequency spectrum illustrating the operation of the wireless repeating system of the seventh embodiment.

The channel setting signal converted in the band of first frequency fi is input to the demodulator 25 and the band rejection filter 24 of the wireless repeater 102 in FIG. 14, and the former is input to the frequency setting circuit 19 after the channel set contents has been demodulated and the latter is eliminated by the band rejection filter 24 to generate a frequency spectrum of the original signal of FIG. 16D not including the channel setting signal of frequency fc-ch.

Figure 16E:
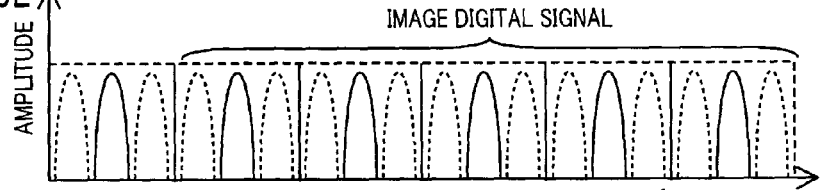
FIG. 16E is a frequency spectrum illustrating the operation of the wireless repeating system of the seventh embodiment.

In a digital signal processor in the wireless repeater 102, by oversampling the frequency spectrum of FIG. 16D, plural image digital signals of FIG. 16E is generated. The spectrum of FIG. 16E contains plurality of the frequency spectrum of FIG. 16D of the integral multiple ratio of the frequency spectrum of the oversampling frequency (fos) to the (first) sampling frequency (fi) of the ADC 13.

Figure 16F:
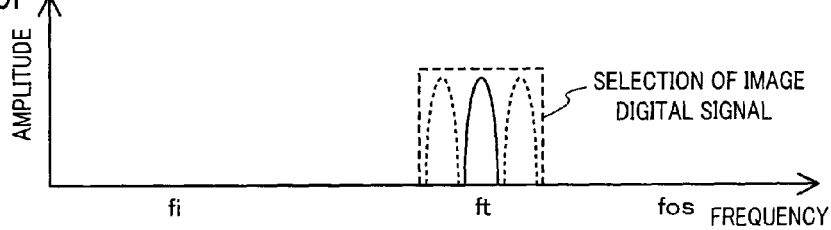
FIG. 16F is a frequency spectrum illustrating the operation of the wireless repeating system of the seventh embodiment.

From these plural image digital signals, only the spectrum of one required image digital signal is selected by the bandpass filter 15 to obtain the spectrum of FIG. 16F. The selected image digital signal spectrum of FIG. 16F is input to the delta-sigma type DAC 16 and is radiated to space as a second analog signal from the transmit antenna 20 of the wireless repeater, as with operation described in the embodiment 2.

Figure 17A:
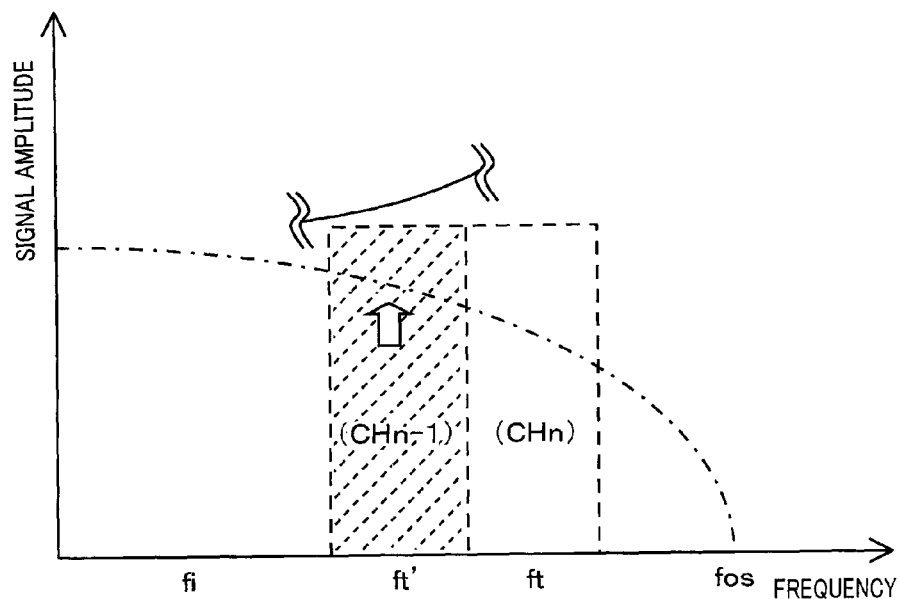
FIG. 17A is a frequency spectrum illustrating the operation of a frequency conversion delta-sigma transmitter of the seventh embodiment.
Figure 17B:
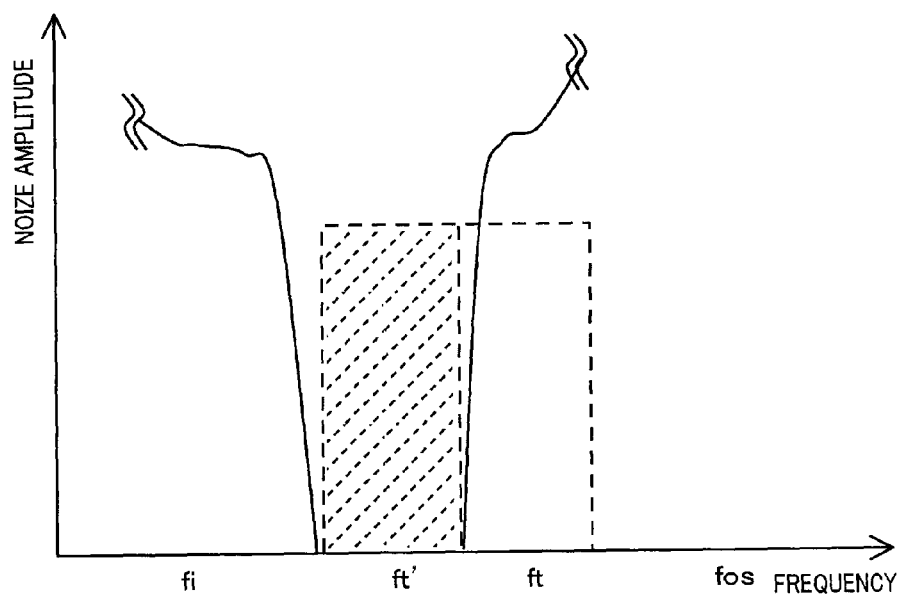
FIG. 17B is a frequency spectrum illustrating the operation of the frequency conversion delta-sigma transmitter of the seventh embodiment.

FIG. 17A shows characteristics of the signal transfer function of a delta-sigma circuit. FIG. 17B shows characteristics of the noise transfer function of a delta-sigma circuit. That is, they are a dynamic characteristic when the delta-sigma transmission circuit uses a channel setting signal, and they can dynamically realize in a desired frequency band inversed distortion characteristics and noise minimizing characteristics with channel setting signal respectively.

According to this embodiment, a wireless repeater can automatically decode a channel setting signal included in a received signal and change the transmit frequency, and thus can dynamically change a channel that delivers the contents to be received by a terminal, which is effective for diversification of services of a broadcast delivery system.

Also, since this embodiment enables a wireless repeater to include a control signal to change transmit frequency of the wireless repeater in a reception signal, it is possible to make the transmit frequency of the wireless repeater variable dynamically, and also to dynamically change the channel that delivers contents to be received by the wireless repeater in a wireless repeating system that has a wireless repeater and a hub base-station and uses a wireless repeater equipped with a frequency conversion delta-sigma transmission circuit. This is effective for diversification of services of the broadcast delivery system.

Embodiment 8

Figure 18:
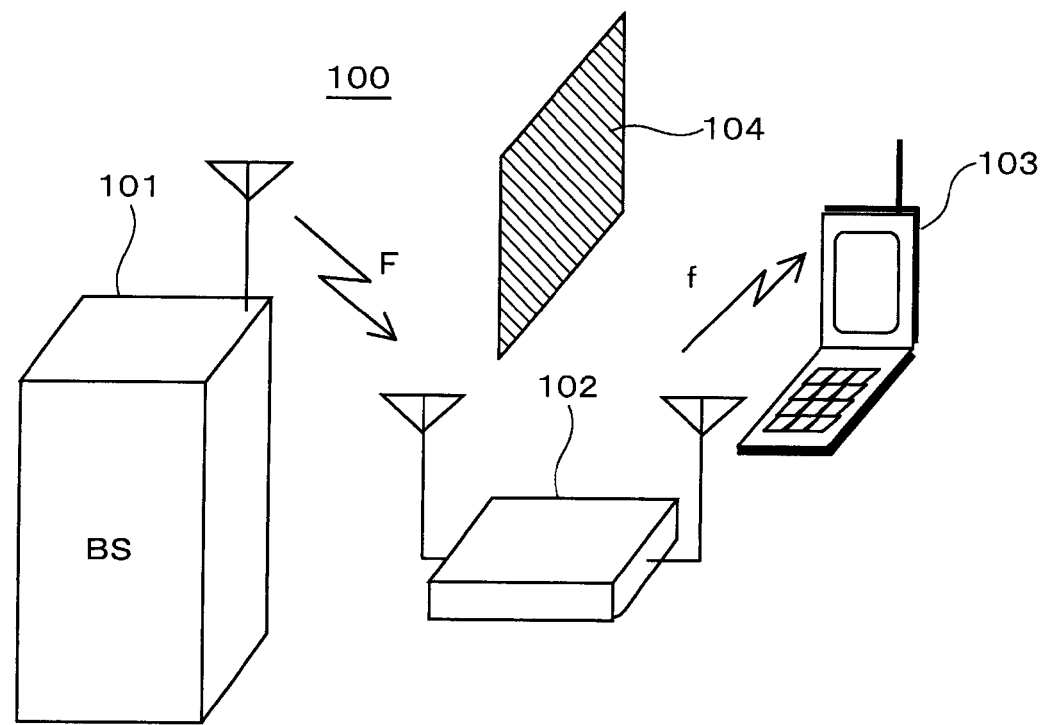
FIG. 18 is a block diagram of a wireless repeating system of an eighth embodiment of the present invention using the wireless repeater.

FIG. 18 is a diagram showing still another embodiment (ninth embodiment of the present invention) of a wireless repeating system 100 using a wireless repeater. The wireless repeating system 100 is a system including a hub base-station 101, a wireless repeater 102, and a wireless terminal 103 as described in one of the previous embodiments. The wireless repeater 102 and the wireless terminal 103 realizes short-distance wireless broadcast services, but since transmission distance form the hub base-station 101 to the wireless repeater 103 is long, the transmission output of the hub base-station 101 must be larger than that of wireless repeater 102. To prevent large transmission output from the hub base-station from interfering with the wireless terminal 103, the transmission frequency F of the first analog signal of the hub base-station 101 must be different from the transmission frequency f of the second analog signal of the wireless repeater 102. In this figure, since there is an obstacle 104 between the hub base-station 101 and the wireless terminal 103, they are not visible from each other.

According to this embodiment, even if there is the wireless terminal 103 at a location whereto a radio wave from invisible the hub base-station 101 is hard to reach, transmission services from the hub base-station 101 can be received by the wireless terminal 103, resulting in an increase in the service area of a broadcasting system.

Embodiment 9

Figure 19:
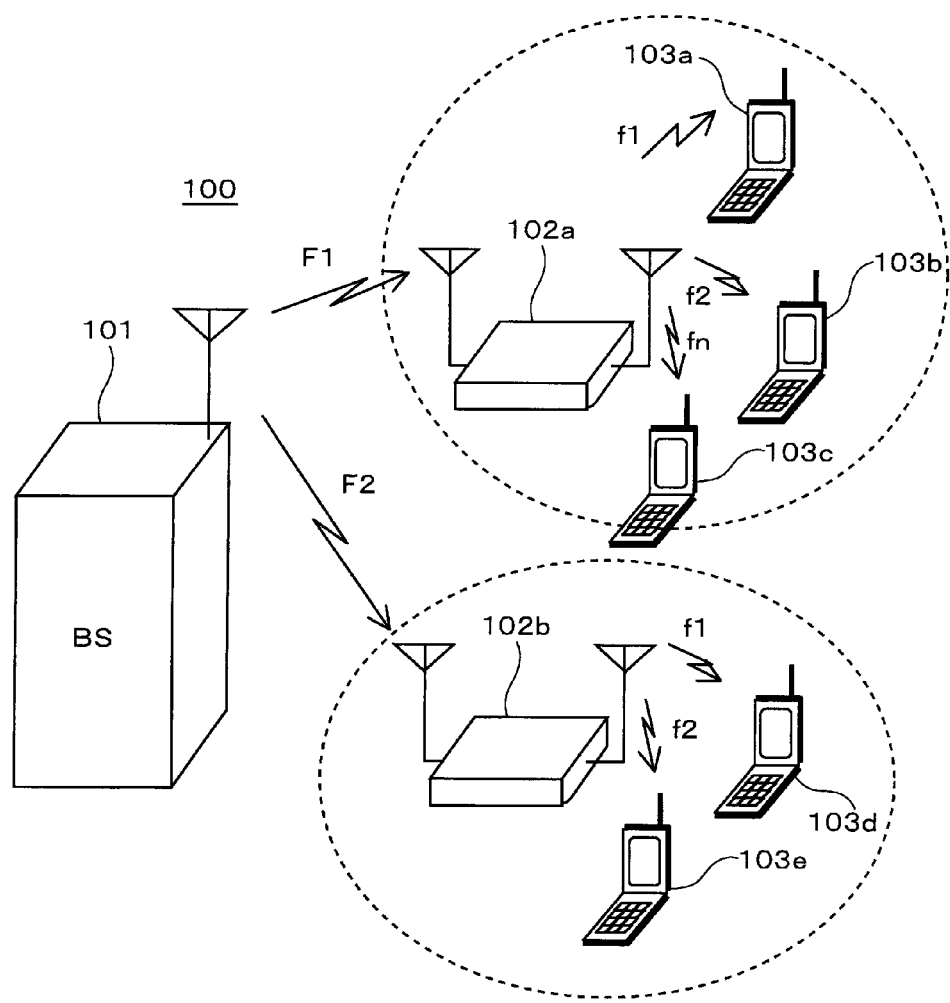
FIG. 19 is a block diagram of a wireless repeating system of a ninth embodiment of the present invention using the wireless repeater.

FIG. 19 is a diagram showing a configuration of another embodiment (ninth embodiment of the present invention) of a wireless repeating system using a wireless repeater. A wireless repeating system 100 is a system including a hub base-station 101, plural wireless repeaters 102 (a to b), and plural wireless repeaters 103 (a to n) as described in one of the previous embodiments. Transmission frequencies f1 to fn of the second analog signal from the wireless repeater 102 to the wireless terminal 103 are different from transmission frequencies F1 to Fn of the first analog signal.

The wireless repeater 102 and the wireless terminal 103 realizes short-distance wireless broadcast services, but since transmission distance form the hub base-station 101 to the wireless repeater 103 is long, the transmission output of the hub base-station 101 must be larger than that of the wireless repeater 102. To prevent large transmission output from hub base-station from interfering with the wireless terminal 103, the transmission frequencies F1 to Fn of the first analog signal of the hub base-station 101 must be different from the transmission frequencies f1 to fn of the second analog signal of the wireless repeater 102. AS number of terminals receiving broadcasting service, the base-station for them must increase the transmission output. Also, to cause power to reach far away larger transmission output is required.

According to this embodiment, it is possible to perform long-distance radio wave transmission from the hub base-station to the wireless repeater to a small number of receivers and to perform short-distance radio wave transmission to a large number of receivers, which enables reduction of whole transmission power used by the system, reduction of the system operation cost, and reduction of environment load due to decreased consumption power.

Embodiment 10

Figure 20:
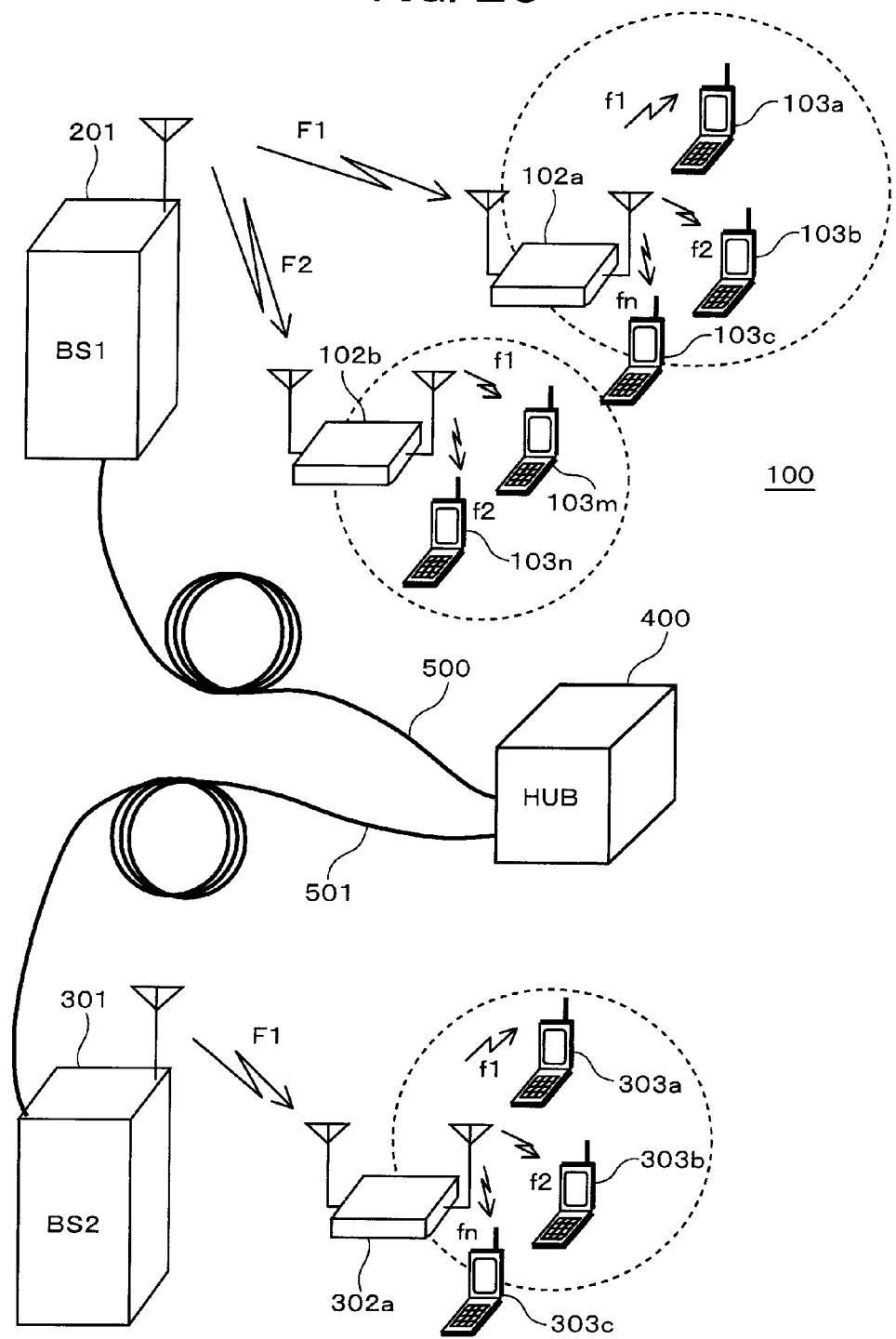
FIG. 20 is a block diagram of a wireless repeating system of a tenth embodiment of the present invention using a large-scale broadcast base-station and the wireless repeater.

FIG. 20 is a diagram showing a configuration of another embodiment ($10^{th}$ embodiment of the present invention) of a wireless repeating system using a wireless repeater. A wireless repeating system 100 is a system including a hub base-station 400, the hub base-stations 201, 301, plural wireless repeater 102, and plural wireless terminal 103, the latter three of which are described in one of the previous embodiments.

In this embodiment, there are plural base-stations 201, 301 that provide broadcast services by receiving wired services using RF cables 500, 501 from the hub base-station 400 that is a large-scale broadcasting station (HUB) located far away. The base-station 201 uses specific frequencies F1, F2 to provide broadcast services and the other base-station 301 use the same frequency F1 to provide broadcast services. From the large-scale broadcasting station (HUB), contents to be broadcast to both base-stations are delivered using RF cables.

As the number of wireless terminals (TS) wanting the provision of services increase, amount of radio wave to be transmitted to each wireless terminal from a base-station also increases, thus making it necessary to increase the transmission output of the base-station. If the transmission output of the base-station is increased, the radio wave may reach to a wireless terminal (TS) located outside of the coverage area of the base-station. By providing services from the large-scale broadcasting station (HUB) to base-stations (BS1, BS2) via RF cables, the base-station (BS1, BS2) can provide services using radio waves of the same frequency without interference with the radio waves. This makes it possible to meet the demand for complementary wireless services for areas where services of the large-scale broadcasting station are available. Also, by minimizing the use of transmission hardware such as RF cables, it is possible to prevent the increase of geological area to be secured for building a base-station and the increase of base-station building cost due to increased number of RF cables.

What is claimed is:

1. A frequency converter comprising:
an original digital signal generator for generating an original digital signal by digitally converting a first analog signal at a first frequency;
an oversampler for oversampling the original digital signal at a second frequency higher than the first frequency;
a zero interpolator for generating a plurality of image digital signals by interpolating a data point after the oversampling;
a frequency axis image selector for selecting an image digital signal occupying a specific frequency band out of the plurality of image digital signals; and
a digital-analog converter for performing noise elimination and waveform shaping for the selected image digital signal occupying a specific frequency band, converting to a second analog signal, and outputting the second analog signal;
wherein the digital-analog converter comprises a delta-sigma modulator;
wherein the delta-sigma modulator is composed of a non-delay circuit and a delay circuit that are multistage cascaded alternatively to each other via a compositor;
wherein an input signal to each of the multistage compositors is weighted and feed-forward added via a constant multiplication circuit and an output signal thereto is weighted and feedback subtracted via another constant multiplication circuit;
wherein an output of the delay circuit at the last cascade stage is quantized via a comparator that is a quantizer; and
wherein a route consisting of the non-delay circuit, the compositor, and the delay circuit has a digital circuit block where a weighting local feedback loop is formed.

2. The frequency converter according to claim 1, further comprising a weighting local feedback loop formed in a route consisting of the delay circuit, the compositor, and the non-delay circuit.

3. The frequency converter according to claim 1,
wherein a noise transfer function of the delta-sigma modulator indicates a minimum value in the frequency band of the image digital signal; and
wherein a signal transfer function of the delta-sigma modulator realizes an inversed waveform of a waveform distortion that corrects the inversed waveform corresponding to Fourier transformation of finite number of pulse signals generated in the comparator.

4. A wireless repeater that converts a first analog signal received by a receive antenna via a frequency converter to generate a second analog signal, and radiates the second analog signal to space via a power amplifier and a transmit antenna,
wherein the frequency converter digitally converts the first analog signal at a first sampling frequency, oversamples a converted original digital signal at a second sampling frequency higher than the first sampling frequency, zero-interpolates a data point after the oversampling, extracts via a digital filter an image digital signal occupying a specific frequency band out of a plurality of image digital signals generated by the zero-interpolation, converts the extracted image digital signal to the second analog signal, and outputs the second analog signal;
wherein the frequency converter comprises:
an analog-digital converter for converting the first analog signal to an original digital signal at the first sampling frequency;
an oversampler for oversampling the original digital signal at the second sampling frequency higher than the first sampling frequency;
a zero-interpolator for zero-interpolating a data point after the oversampling to generate a plurality of image digital signals;
a frequency image selector for selecting an image digital signal occupying a specific frequency band out of the plurality of image digital signals generated by the zero-interpolator; and
a digital-analog converter for performing noise elimination and waveform shaping for the frequency band of the selected specific image digital signal and outputting to the power amplifier as the second analog signal,
wherein
the digital-analog converter is composed of a delta-sigma type digital-analog converter;
the delta-sigma type digital-analog converter comprises non-delay circuit and a delay circuit, which are multi-stage cascaded alternatively to each other via a compositor;
an input signal is weighted and feed-forward added via a constant multiplication circuit and an output signal is weighted and feedbacked via another constant multiplication circuit in each of the multistage compositors;
an output of the delay circuit at the last cascade stage is quantized via a comparator that is a quantizer; and
a route composed of the non-delay circuit, the compositor, and the delay circuit has a digital circuit block where a weighted local feedback loop is formed.

5. The wireless repeater according to claim 4,
further comprising an analog frequency converter composed of a local oscillator and a mixer,
wherein the frequency axis image selector is composed of a band-pass filter; and
wherein after converting an output of the low-noise amplifier to another frequency via the frequency converter, the analog signal is amplified and digitally converted at the first frequency to generate the original digital signal.

6. The wireless repeater according to claim 5, further comprising a frequency setting circuit for changing a constant of a digital circuit block of the delta-sigma type digital-analog converter.

7. The wireless repeater according to claim 6, further comprising a demodulator;
wherein a transmit frequency control signal included in the receive signal is demodulated by the demodulator, and a constant of a digital circuit block of the band-pass filter for image selection and the delta-sigma type digital-analog converter is externally changed using the demodulated signal.

8. A wireless repeating system comprising a hub base-station and at least one wireless repeater,
wherein the hub base-station radiates a first analog signal from a transmit antenna;
wherein the each wireless repeater converts a frequency of a first analog signal received by a receive antenna via a frequency converter to generate a second analog signal and radiates the second analog signal to space via a power amplifier and a transmit antenna;

wherein the each wireless repeater digitally converts the first analog signal at a first sampling frequency, oversamples a converted original digital signal at the second sampling frequency higher than the first sampling frequency, zero-interpolates a data point after sampling, extracts an image digital occupying a specific frequency band out of a plurality of image digital signals generated by zero-interpolation, and converts the image digital signal to the second analog signal via the frequency converter and outputs the second analog signal;

wherein the frequency converter comprises:

an analog-digital converter for digitally converting the first analog signal at the first sampling frequency to generate an original digital signal;

an oversampler for oversampling the original digital signal at the second sampling frequency higher than the first sampling frequency;

a zero-interpolator for zero-interpolating a data point after the oversampling to generate a plurality of image digital signals;

a frequency axis image selector for selecting an image digital signal occupying a specific frequency band out of the plurality of image digital signals generated by the zero-interpolator; and a delta-sigma type digital-analog converter for performing noise elimination and waveform shaping for a frequency band of the selected specific image digital signal and outputting to the power amplifier as the second analog signal, wherein the hub base-station is provided with an analog frequency converter including a signal generator, a low-noise amplifier, a local oscillator, and a mixer, a channel setting signal generator, a modulator, local oscillator, and a compositor;

wherein a signal generated by the signal generator is amplified by the low-noise amplifier, and an output of the channel setting signal generator is converted to a frequency outside of the frequency band of a channel within the frequency band of a signal generated by the signal generator and combined via the modulator and the local oscillator; and wherein a frequency of a carrier wave is converted to a frequency capable of being wirelessly transmitted via the frequency converter.

9. The wireless repeating system according to claim 8, wherein the each wireless repeater has a demodulator and a timer;

wherein a threshold of the time is stored in the demodulator; and wherein the demodulator demodulates a received signal, detects the channel setting signal, and if there is no signal in a frequency band of a signal to be set by the channel setting signal, changes a frequency band of a transmit wave to a frequency band to be specified by the channel setting signal at an interval above the threshold of the timer.

* * * * *